United States Patent [19]
Severinski et al.

[11] Patent Number: 6,108,842
[45] Date of Patent: Aug. 29, 2000

[54] VEHICULAR SEAT ASSEMBLY HAVING A FLEXIBLE AIR BAG SUPPRESSION SENSOR APPARATUS AND METHOD OF INSTALLING THE FLEXIBLE AIR BAG SUPPRESSION SENSOR APPARATUS

[75] Inventors: Paul S. Severinski, Southgate; Andrew F. Pinkos, Clarkston; Alan A. Boisvert, Rochester Hills, all of Mich.

[73] Assignee: Lear Automotive Dearborn, Inc., Southfield, Mich.

[21] Appl. No.: 09/106,523

[22] Filed: Jun. 29, 1998

[51] Int. Cl.[7] .......................... B44C 1/165; B32C 31/00; A47C 20/02

[52] U.S. Cl. ................. 5/653; 5/655.9; 156/230; 156/303.1

[58] Field of Search .............. 156/78, 230, 239, 156/240, 299, 300, 303.1; 5/653, 655.9, 693, 694, 424, 713; 297/217.2, 217.3, 452.26

[56] References Cited

U.S. PATENT DOCUMENTS

| | | |
|---|---|---|
| 4,378,396 | 3/1983 | Urai et al. ................................ 5/653 X |
| 4,403,356 | 9/1983 | Urai ............................................ 5/653 |
| 4,722,760 | 2/1988 | Shimada ................... 156/214 |
| 4,797,962 | 1/1989 | Goode .......................................... 5/713 |
| 4,995,926 | 2/1991 | Urai ........................................ 156/78 |
| 5,068,504 | 11/1991 | Rogers . |
| 5,157,372 | 10/1992 | Langford . |
| 5,260,684 | 11/1993 | Metzmaker . |
| 5,309,135 | 5/1994 | Langford . |
| 5,413,378 | 5/1995 | Steffens, Jr. et al. . |
| 5,454,591 | 10/1995 | Mazur et al. . |
| 5,474,327 | 12/1995 | Schousek . |
| 5,515,933 | 5/1996 | Meyer et al. . |
| 5,573,269 | 11/1996 | Gentry et al. . |
| 5,592,705 | 1/1997 | West .......................................... 5/424 |
| 5,602,425 | 2/1997 | Wilhelmi et al. . |
| 5,605,348 | 2/1997 | Blackburn et al. . |
| 5,612,876 | 3/1997 | Zeidler et al. . |
| 5,615,917 | 4/1997 | Bauer . |
| 5,984,349 | 11/1999 | Van Voorhies ................... 297/217.2 X |

FOREIGN PATENT DOCUMENTS

| | | |
|---|---|---|
| 0 900 705 | 3/1999 | European Pat. Off. . |
| 42 37 072 | 12/1993 | Germany . |
| WO 98/30413 | 7/1998 | WIPO . |

*Primary Examiner*—Michael F. Trettel
*Attorney, Agent, or Firm*—MacMillan, Sobanski & Todd, LLC; A. Michael Tucker; Robert F. McBeth

[57] ABSTRACT

A vehicular seat assembly includes a flexible sensor apparatus mounted to a seat cushion. The flexible sensor apparatus includes a plurality of variable resistant flexible sensors attached to nonconductive flexible ribbons. Each flexible sensor generates a signal dependent on the degree of bending exhibited by a given flexible sensor for controlling the deployment of an air bag. An installation mat for installing the flexible sensor apparatus includes a carrier means attached to the flexible sensor apparatus. The carrier means includes locating means for locating the flexible sensor apparatus to the seat cushion. An installation device for installing the flexible sensor apparatus includes a lid having a mounting means for detachably attaching the installation mat to the lid. The installation device also includes a locating means for locating the flexible sensor apparatus to the seat cushion. A method for installing the flexible sensor apparatus to the seat cushion includes the steps of providing a carrier means attached to the flexible sensor apparatus, aligning the carrier means with the seat cushion and attaching the flexible sensor apparatus to the seat cushion. The carrier means may include one or more in combination of a trim cover, backing sheet, carrier sheet and lid.

33 Claims, 11 Drawing Sheets

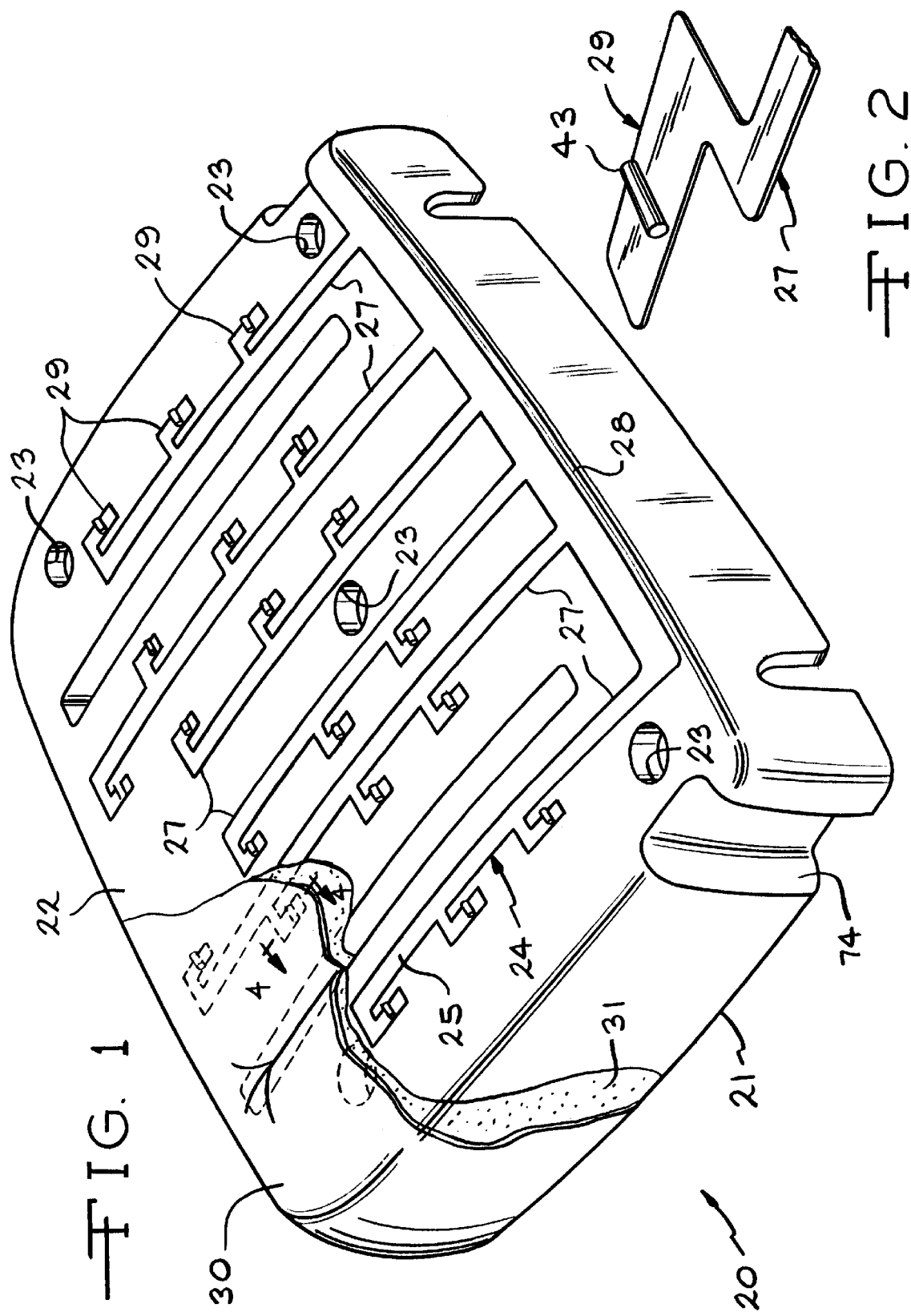

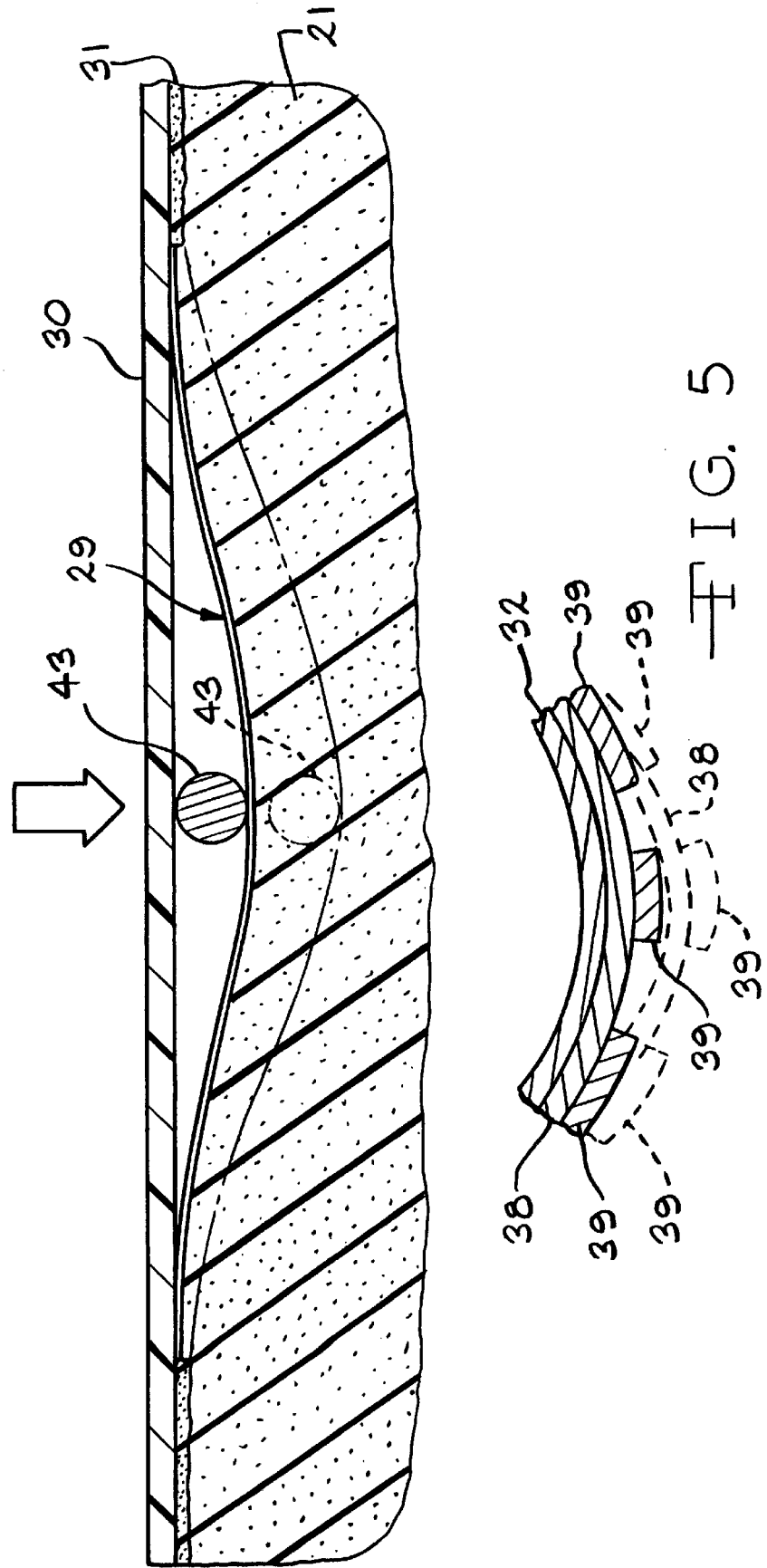

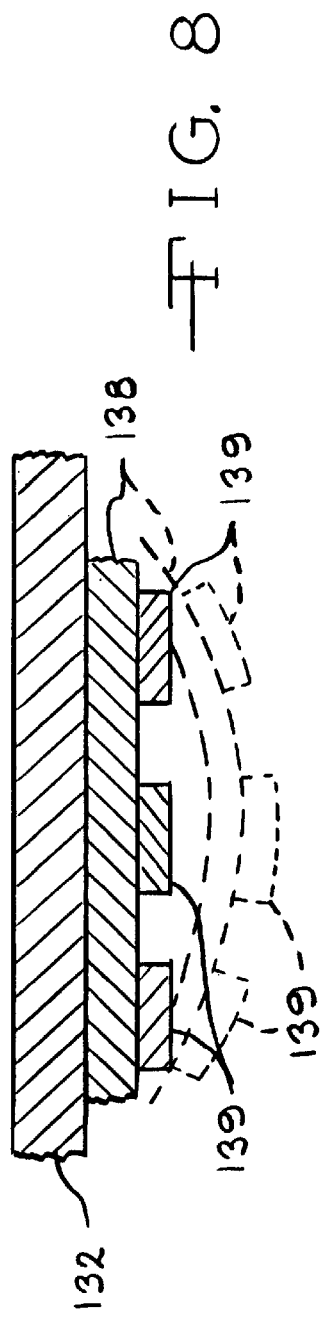
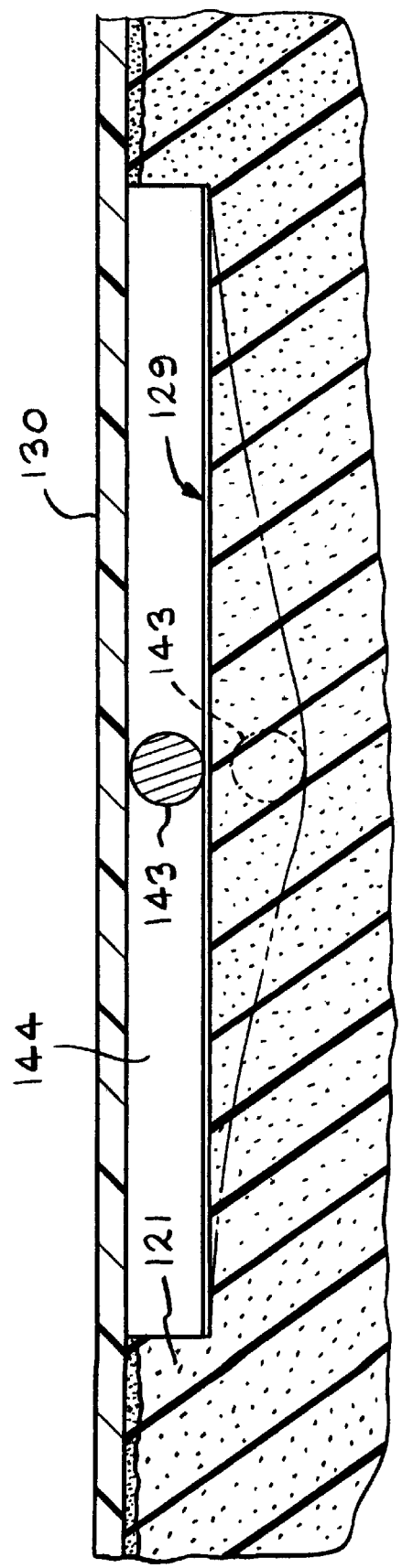
FIG. 8
FIG. 7

VEHICULAR SEAT ASSEMBLY HAVING A FLEXIBLE AIR BAG SUPPRESSION SENSOR APPARATUS AND METHOD OF INSTALLING THE FLEXIBLE AIR BAG SUPPRESSION SENSOR APPARATUS

BACKGROUND OF THE INVENTION

This invention relates in general to a vehicular seat assembly. More specifically, this invention relates to a vehicular seat assembly having a flexible air bag suppression sensor apparatus and a method of installing the flexible air bag suppression sensor apparatus.

Vehicular air bags play an important role in restraining a seat occupant in vehicular crash situations. However, air bags designed for adequately restraining a large sized occupant may not provide optimal restraint protection for a smaller sized occupant or for a child occupying a child seat. In addition, the deployment of an air bag corresponding to an unoccupied seat represents an unnecessary repair expense.

Sensor apparatuses have been proposed for detecting whether or not a given seat is occupied. These types of sensor apparatuses act as on/off switches in controlling the deployment of a corresponding air bag. However, these types of sensor apparatuses simply address the need for preventing the deployment an air bag when the seat is unoccupied.

Other sensor apparatuses have been proposed to detect the placement of an occupant in a given seat for the purpose of suppressing the deployment of a corresponding air bag. Specifically, these types of sensor apparatuses detect whether or not the front and/or rear portions of a given seat are occupied. In situations in which only the front or only the rear portion of the seat is occupied, a sensor apparatus provides a signal for controlling the degree in which the air bag is to be suppressed during deployment. However, these sensor apparatuses do not provide a means for suppressing the air bag when both the front and rear portions of the seat are occupied.

Other sensor apparatuses have been proposed which determine the weight of an occupant based on detected variations in seat occupancy loading for providing a means of controlling the degree in which a respective air bag is to be suppressed during deployment. However, these types of sensor apparatuses require that a sensor apparatus be directly mounted to the structure of a given seat and that the sensor apparatus itself be structural. Consequently, these sensor apparatuses are relatively massive. Additionally, these sensor apparatuses are typically sensitive to physical and environmental changes which affect the repeatability of the performance of the sensor apparatus.

SUMMARY OF INVENTION

This invention concerns a vehicular seat assembly including a flexible sensor apparatus mounted to a seating face of a seat cushion. The flexible sensor apparatus includes at least one sensor track disposed in at least one track channel in the seating face. The flexible sensor apparatus is capable of detecting both the size of a passenger and the presence of an occupied child seat for the purpose of controlling the degree in which a corresponding air bag is to be suppressed during deployment. The flexible sensor apparatus offers improved reliability, as well as the advantages of being nonstructural and compact.

This invention also concerns a method of installing the flexible sensor apparatus to the seating face. This method includes the steps of providing a carrier means attached to the flexible sensor apparatus for installing the flexible sensor apparatus to the seating face, aligning the flexible sensor apparatus with the seating face, and attaching the flexible sensor apparatus to the seating face.

The carrier means may include a trim cover having an underside. The flexible sensor apparatus is attached to the underside. Alternatively, the carrier means may include a carrier sheet and/or a backing sheet. The flexible sensor apparatus is detachably attached to the carrier sheet and/or backing sheet so as to form an installation mat. Furthermore, the carrier means may include a lid of an associated installation device. One of the flexible sensor apparatus, trim cover or installation mat is detachably attached to the lid of the associated installation device.

Various other objects and advantages of this invention will become apparent to those skilled in the art from the following detailed description of the preferred embodiments, when read in light of the accompanying drawings.

BRIEF DESCRIPTION OF THE DRAWINGS

FIG. 1 is a perspective view of a first embodiment of a vehicular seat cushion assembly according to this invention;

FIG. 2 is an enlarged perspective view of a sensor branch shown in FIG. 1 removed from a seat cushion for clarity of illustration;

FIG. 4 is a enlarged sectional view taken along line 4—4 of FIG. 1;

FIG. 5 is a greatly enlarged view of a portion of the sensor branch shown in FIG. 4 illustrating a flexible sensor;

FIG. 7 is a enlarged sectional view taken along line 7—7 of FIG. 6;

FIG. 8 is a greatly enlarged sectional view of a portion of a sensor branch illustrated in FIG. 7 showing a flexible sensor;

DETAILED DESCRIPTION OF THE PREFERRED EMBODIMENTS

Figure 3:
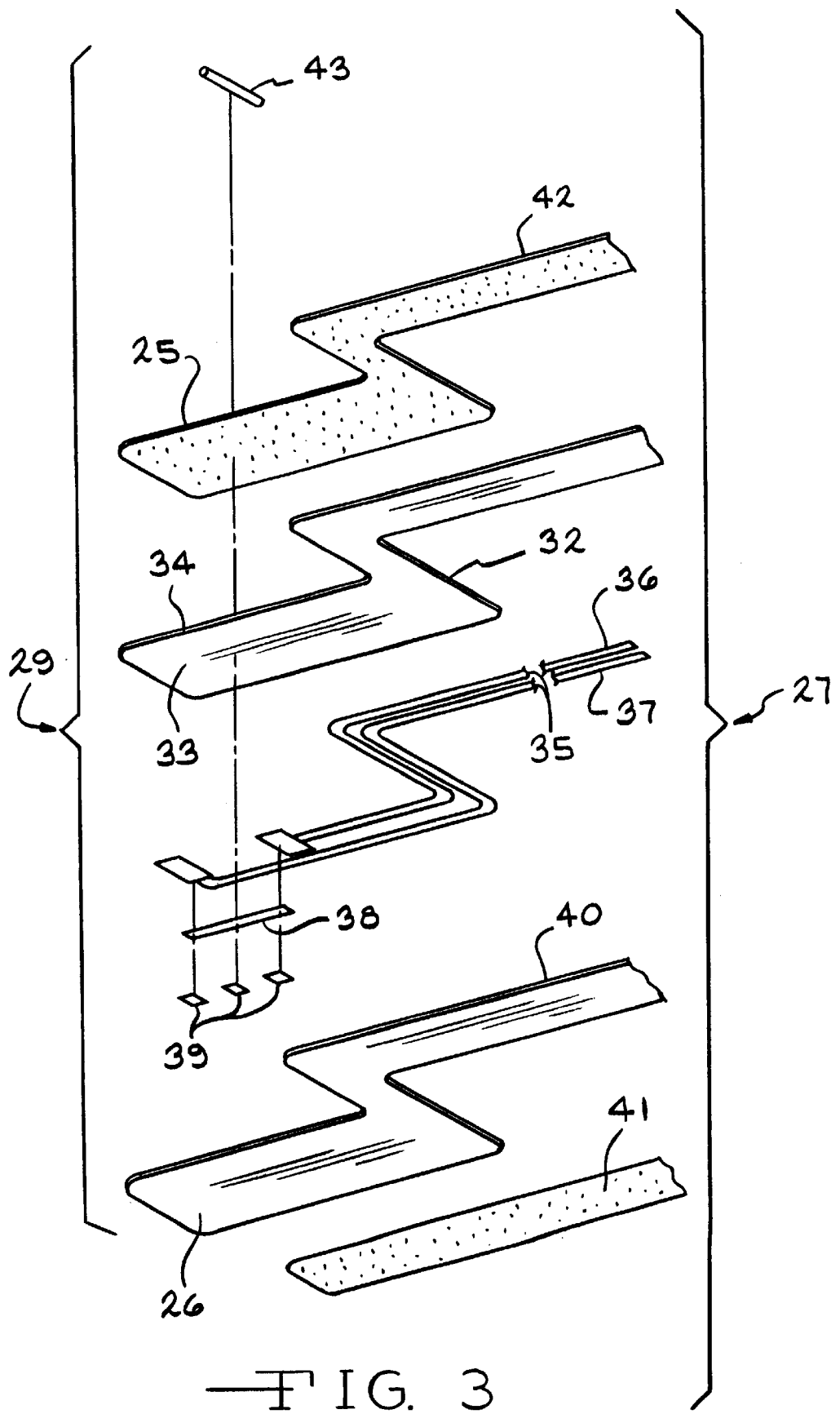
FIG. 3 is an exploded perspective view of the sensor branch shown in FIG. 2 illustrating a flexible sensor.

A first embodiment of a vehicular seat cushion assembly is shown generally at 20 in FIG. 1. The vehicular seat cushion assembly 20 comprises a seat cushion 21 having a seating face 22. The seat cushion 21 is shown as a seat bottom cushion, but may be a seat back cushion. The seating face 22 includes a plurality of locating recesses 23. Each locating recess 23 is adapted for receiving a corresponding locating boss of an installation device (not illustrated in FIG. 1). One of the locating recesses 23 is adjacent to the center of the seating face 22, and one of the locating recesses 23 is adjacent to one of each of the corners of the seating face 22.

The vehicular seat cushion assembly 20 further comprises a flexible sensor apparatus indicated generally at 24. The flexible sensor apparatus 24 has a loading face 25 and a mounting face 26 (FIG. 3) opposite the loading face 25. The mounting face 26 contacts the seating face 22. The flexible sensor apparatus 24 acts as a signal generator for controlling the deployment of a passenger air bag (not shown).

The locating recesses 23 locate the installation device to the seating face 22. The installation device is used in mounting the flexible sensor apparatus 24 to the seating face 22. The details of the installation device are described below.

The flexible sensor apparatus 24 includes a plurality of sensor tracks 27 extending from a lead track 28. Each sensor track 24 includes a plurality of sensor branches 29. The sensor branches 29 represent the actual sensing portion of the flexible sensor apparatus 24. The placement and the number of sensor branches 29 are empirically determined for a given vehicular seat cushion assembly.

A trim cover 30 is adhered to the seating face 22 by a trim adhesive 31 applied to the underside of the trim cover 30, whereby the flexible sensor apparatus 24 is captured between the trim adhesive 31 and the seating face 22.

An enlarged view of one of the sensor branches 29 is shown in FIG. 2. FIG. 3 is an exploded view of the sensor branch 29 shown in FIG. 2. Referring to FIG. 3, each sensor branch 29 includes a flexible ribbon 32 having a sensor face 33 and a tape face 34 opposite the sensor face 33. The flexible ribbon 32 consists of a well-known elastic-nonconductive material. Examples of such materials include various polymers such as polyimide, polycarbonide, or Mylar. The preferred thickness of the flexible ribbon 32 is about 0.5–1.5 millimeters.

A first conductor 35 is attached to the sensor face 33. The first conductor 35 consists of a well-known elastic-constant-resistance-conductive material. Preferably, the first conductor 35 is conductive ink applied in a liquid form that adheres to sensor face 33 when dry. The preferred thickness of the first conductor 35 is about 0.01–1.0 millimeters. The first conductor 35 includes a first leg 36 and a second leg 37. One end of each of the first leg 36 and second leg 37 is connected to an appropriate electrical device (not shown) such as a microprocessor.

A flexible sensor 38 is attached to the sensor face 33 and interconnects a terminating end of each of the first leg 36 and second leg 37. The flexible sensor 38 consists of a well-known elastic-variable-resistance-conductive material. Preferably, the flexible sensor 38 is conductive ink applied in a liquid form that adheres to sensor face 33 when dry. The selected ink may include graphite in combination with a binder. The preferred thickness of the flexible sensor 38 is about 0.1–1 millimeters. The shape of the flexible sensor 38 is shown to be straight but may be any designated pattern depending on a given application. The flexible sensor 38 generates a voltage signal that varies with the degree of bending exhibited by the flexible sensor 38. In other words, the resistance of the flexible sensor 38 varies as the flexible sensor 38 moves between an unloaded position and a maximum loaded position. FIG. 4 illustrates the unloaded position and maximum loaded position (shown in phantom) of a given sensor branch 29.

FIG. 5 shows an enlarged portion of FIG. 4 illustrating the flexible sensor 38 in the unloaded position and maximum loaded position (shown in phantom). The flexible sensor 38 is shown slightly bent in the unloaded position. This bending is due to the trim cover 30 being tautly fastened to the seat cushion 21. For the purposes of this description, the term unload and loaded refer to seat occupancy loading conditions.

FIGS. 3 and 5 further show a second conductor 39 attached to the flexible sensor 38. The second conductor 39 is well-known elastic-constant-resistance-conductive material. Preferably, the second conductor 39 is silver formed in segments and is applied in a liquid form so as to bond to the flexible sensor 38 when dry. The second conductor 39 regulates the resistivity of the flexible sensor 38, thereby reducing the variance of the signal generated by the flexible sensor 38. The preferred thickness of the second conductor 39 is about 0.2–1 millimeters. The length, width and spacing of the segments of the second conductor 39 are empirically determined to ensure that the signal generated by the flexible sensor 38 is consistently repeatable between the unloaded and maximum loaded positions.

A protective coating 40 is applied to sensor face 33 so as to cover the flexible sensor 38, the first conductor 35 and the second conductor 39. The protective coating 40 acts a moisture barrier and is of a well-known moisture-proof material. A ribbon adhesive 41 covers a predetermined portion of the protective coating 40. The ribbon adhesive 41 contacts the seating face 22, thereby adhering the flexible ribbon 32 to the seating face 22. Alternatively, the ribbon adhesive 41 may be replaced by any suitable means of attachment such as hook-and-loop fasteners, self-tapping fasteners, or the like. Additionally, the ribbon adhesive 41 may be directly applied to a predetermined portion of the seating face 22 rather than being directly applied to the protective coating 40.

A protective tape 42 is adhered to the tape face 34. The protective tape 42 protects the flexible ribbon 32 against puncturing or tearing and is of a well-known tear-resistant material.

A cylindrically shaped flexor 43 is adhered to the protective tape 42. Preferably, the length of the flexor 43 is substantially perpendicular to the length of the flexible sensor 38, and the approximate midpoint of the length of the flexor 43 is adjacent to the approximate midpoint of the length of the flexible sensor 38. The flexor 43 is of a well-known rigid material. The flexor 43 causes the flexible sensor 38 to bend when the seating face 22 is subject to seat occupancy loading in the vicinity of the flexor 43.

As can be appreciated by one skilled in the art, for applications that allow the ribbon adhesive 41 to be applied to the entire portion of mounting face 26, the protective coating 40 may be eliminated. In these applications, the ribbon adhesive 41 acts both as an attachment means and as a moisture barrier. In addition, for certain other applications where an extensive fatigue life is not an issue, the thickness of the flexible ribbon 32 can be increased so as to prevent tearing and puncturing of the flexible ribbon 32 while eliminating the need for the protective tape 42. Furthermore, in certain other applications the trim cover 30 may by itself provide significant protection for the flexible ribbon 32, thereby eliminating the need for the protective tape 42 without increasing the thickness of the flexible ribbon 32.

Additionally, the flexible sensor apparatus 24 may be attached to a predetermined portion of the underside of the trim cover 30 prior to the trim cover 30 being adhered to the seating face 22. Regarding this arrangement, the flexible sensor apparatus 24 and the trim cover 30 may include corresponding sight-lines or any other suitable locating means for properly locating the flexible sensor apparatus 24 to the trim cover 30. The flexible sensor apparatus 24 may be attached to the trim cover 30 by thread, glue, hook-and-loop fasteners, or the like. Having attached the flexible sensor apparatus 24 to the trim cover 30, the trim cover 30 acts as a carrier means for installing the flexible sensor apparatus 24 to the seating face 22. A detailed description regarding the installation of the flexible sensor apparatus is provided below.

Figure 6:
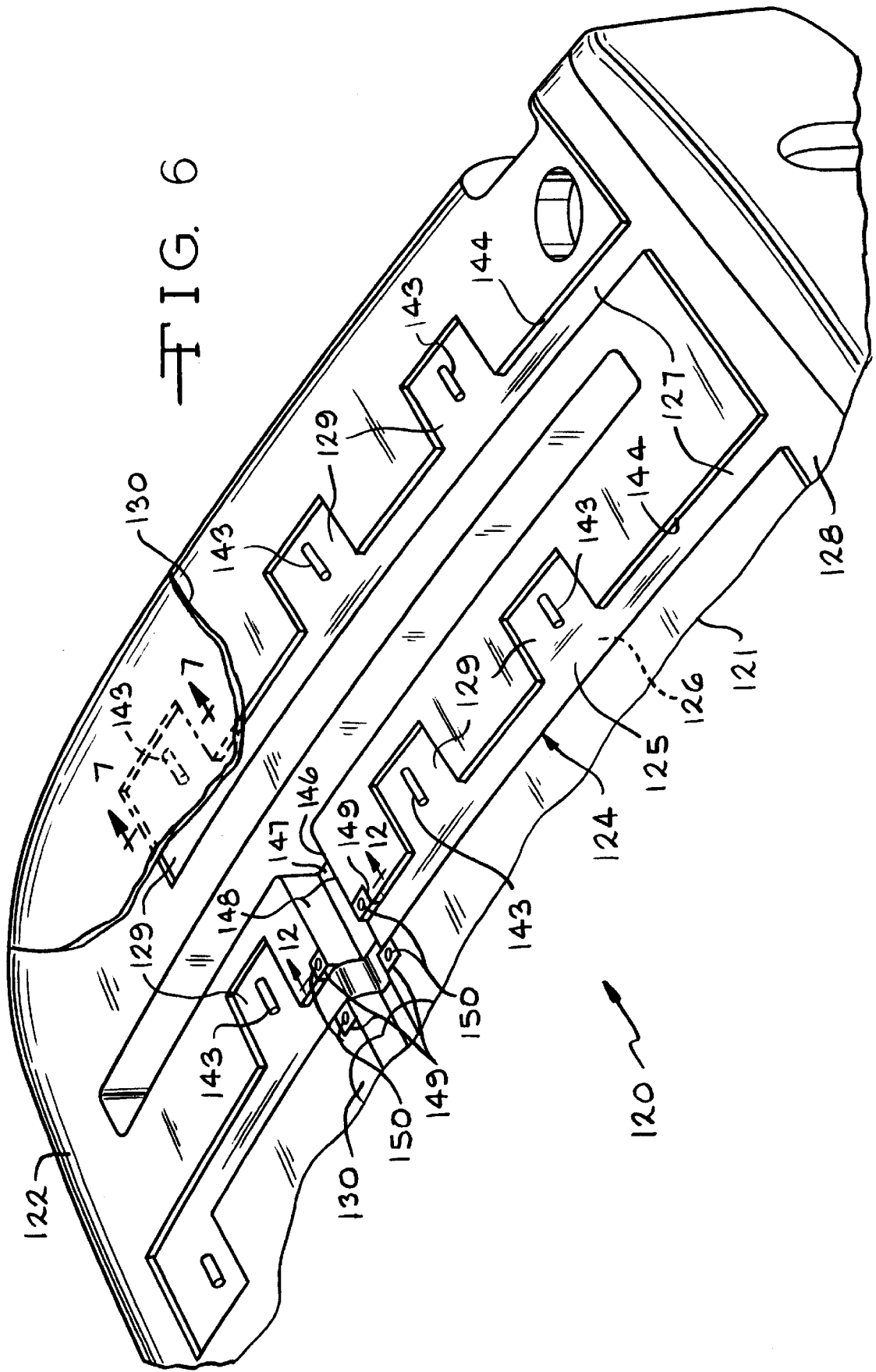
FIG. 6 is a perspective view of a portion of a second embodiment of a vehicular seat cushion assembly according to this invention.
Figure 12:
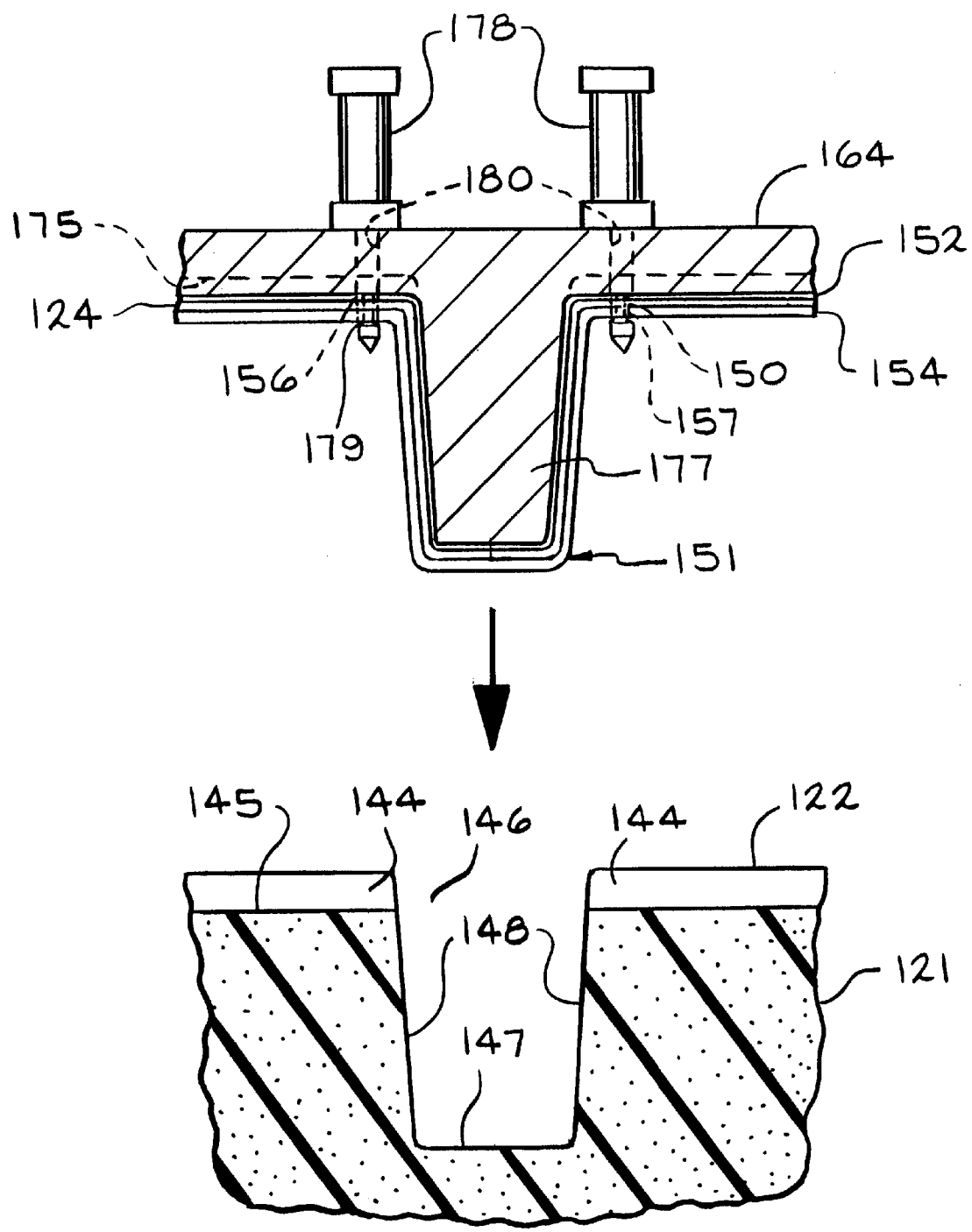
FIG. 12 is an enlarged sectional view taken along line 11—11 of FIG. 6, as well as a sectional view of the corresponding portion of the installation mat shown in FIG. 11, and a sectional view of the corresponding portion of the installation device shown in FIG. 11.

A portion of a second embodiment of a vehicular seat cushion assembly is shown generally at 120 in FIG. 6. In addition to the features associated with the embodiment illustrated in FIG. 1, the vehicular seat cushion assembly 120 comprises a seat cushion 121 having a seating face 122. The seating face 122 includes a plurality of track channels 144 having a first base surface 145 (FIG. 12). The vehicular seat cushion assembly 120 further comprises a flexible sensor apparatus 124 having a loading face 125 and a mounting face 126 opposite the loading face 125. The flexible sensor apparatus 124 includes a plurality of sensor tracks 127 extending from a lead track 128. Each sensor track 127 and the lead track 128 are disposed in a corresponding track channel 144, whereby the mounting face 126 contacts the first base surface 145. A plurality of sensor branches 129 extend from each sensor track 127.

FIG. 7 shows an enlarged view of a given sensor branch 129 disposed in the corresponding track channel 144 illustrated in an unloaded position and a maximum loaded position (indicated in phantom). The depth of each track channel 144 is such that a flexor 143 of the sensor branch 129 is generally flush with the adjacent outermost portion of the seating face 122.

FIG. 8 is a greatly enlarged sectional view of a portion of the sensor branch shown in FIG. 7 illustrating a flexible sensor 138 in an unloaded position and maximum loaded position (shown in phantom). The flexible sensor 138 is attached to a flexible ribbon 132. A second conductor 139, illustrated in preferred segments, is attached to the flexible sensor 138.

Referring again to FIG. 6, the seating face 122 further includes a cross-car trim channel 146. The cross-car trim channel 146 receives a corresponding portion of a trim cover 130. The cross-car trim channel 146 intersects several of the track channels 144. The cross-car trim channel 146, formed deeper than the track channels 144, has a second base surface 147 and a pair of opposing walls 148 extending outwardly from the second base surface 147. Each of the sensor tracks 127 that intersects the cross-car trim channel 146 contacts the trim walls 148 and the second base surface 147. A ribbon adhesive (not shown) is preferably applied only to the portion of the sensor track 127 contacting the second base surface 147, regarding the portion of each sensor track 127 that intersect the cross-car trim channel 146,.

Additionally, each sensor track 127 that intersect the cross-car trim channel 146 includes a tab 149 adjacent to each corner of the intersection between the cross-car trim channel 146 and the corresponding track channel 144. Each tab 149 includes a track aperture 150 adapted for receiving a corresponding projection pin of an installation device (not illustrated in FIG. 6). Use of the track apertures 150 is discussed in the detailed description of the installation device provided below.

The vehicular seat cushion assemblies 20 and 120 operate alike with respect to the function provided by the flexible sensor apparatus 24 and 124, respectively. As such, reference is made only to the vehicular seat cushion assembly 20 in describing its operation. As mentioned above, the flexible sensor apparatus 24 is used to control the deployment of a passenger air bag. Specifically, the flexible sensor apparatus 24 is calibrated to detect the size and the position of a passenger occupying the seat cushion 21. In addition, the flexible sensor apparatus 24 is calibrated to detect if a child occupying a child seat is placed on the seat cushion 21. The flexible sensor apparatus 24 is calibrated by placing various sized test dummies and various types of child seats simulating child occupancy in various placements upon the seat cushion 21. Each of these test conditions places a given load upon a given flexor 43. In turn, the given flexor 43 causes the corresponding flexible sensor 38 to bend a given amount. The given flexible sensor 38 in turn generates a given signal. The signals generated by each flexible sensor 38 are recorded in a microprocessor, thereby providing a distinct mapping of the loading profile for a given test condition.

Each flexor 43 when subject to an actual seat occupancy load forces the corresponding flexible sensors 38 to bend. In turn, a given flexible sensor 38 generates a signal dependent upon the amount of bending exhibited by the given flexible sensor 38. The microprocessor then reads the signals generated by each of the flexible sensors 38 and makes a record of the actual loading profile. The microprocessor then compares the actual loading profile to the recorded empirical profiles and selects the best fit. Depending on the empirical profile selected, the microprocessor then generates a signal that controls the degree in which a respective air bag is to be suppress during deployment.

Figure 9:
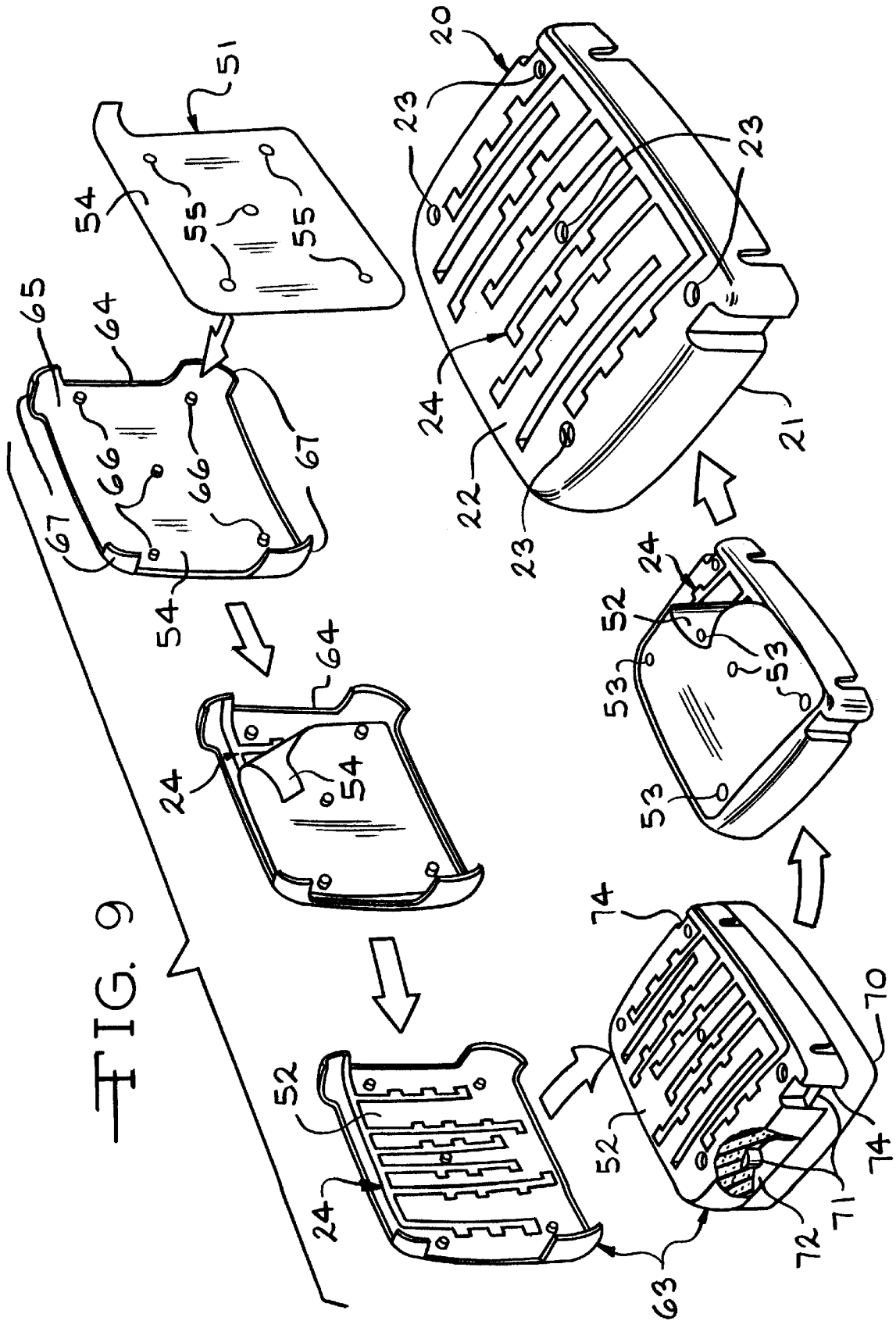
FIG. 9 is a reduced view of the vehicular seat cushion shown in FIG. 1, as well as a perspective view of a first embodiment of an installation mat and of a first embodiment of a installation device according to this invention, illustrating the sequence of a preferred method of installing a flexible sensor apparatus to a seat cushion of the vehicular seat cushion assembly.
Figure 10:
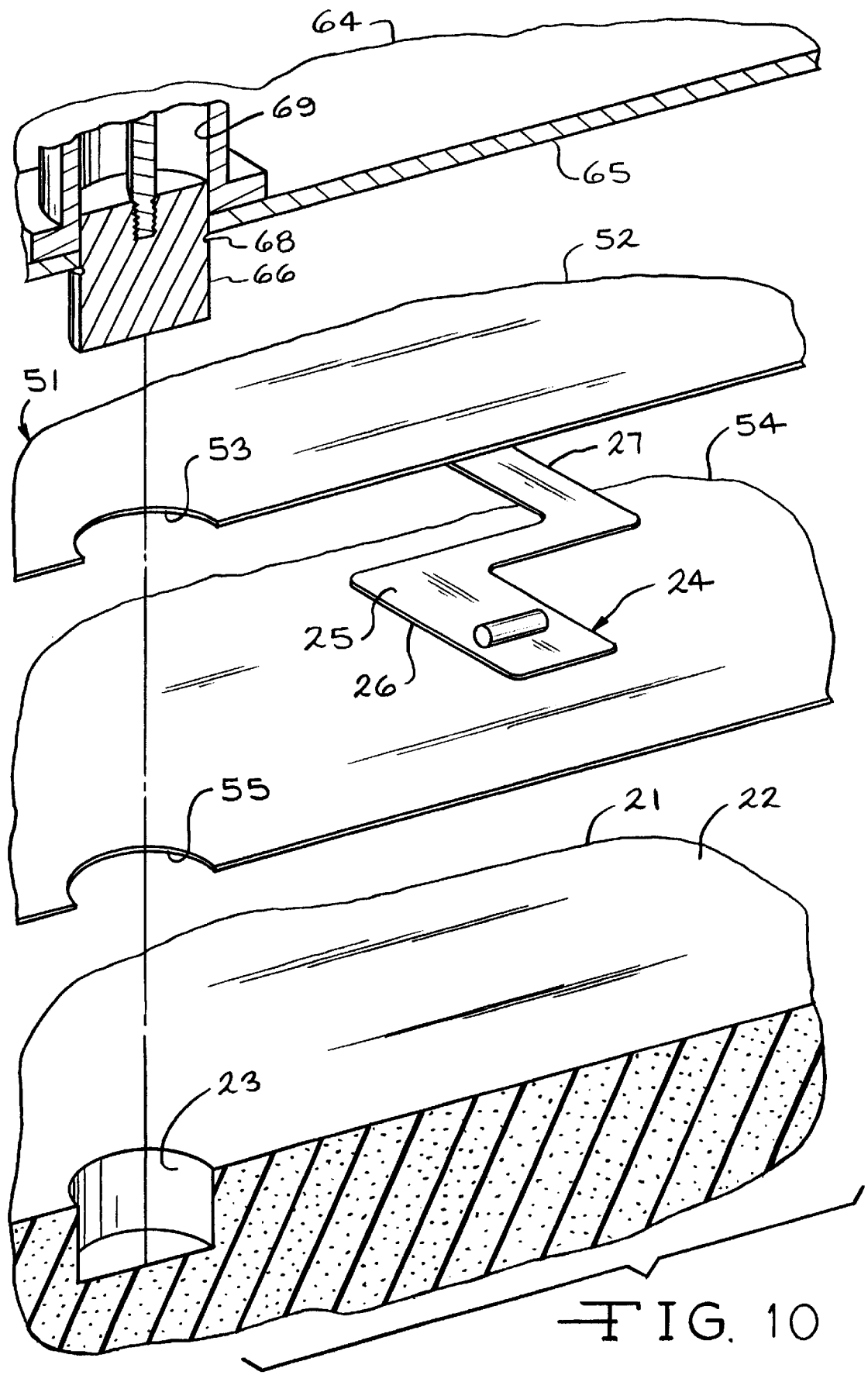
FIG. 10 is an enlarged exploded sectional view of a portion of the seat cushion, as well as the corresponding portion of the installation mat (shown exploded) shown in FIG. 9, and the corresponding portion of the installation device shown in FIG. 9.

A first embodiment of an installation mat is indicated generally at 51 in FIG. 9. The installation mat 51 is used for installing the flexible sensor apparatus 24 to the vehicular seat cushion assembly 20. FIG. 10 shows an exploded view of an enlarged portion of the installation mat 51. The installation mat 51 comprises a carrier means attached to the flexible sensor apparatus 24. As can be appreciated, a similar apparatus such as the apparatus described in U.S. Pat. No. 5,612,876 ("the '876 patent) may be used as a substitute for the flexible sensor apparatus 24.

The carrier means includes a carrier sheet 52 detachably attached to the loading face 25 of the flexible sensor apparatus 24. The carrier sheet 52 is generally rectangular in shape and is sized so as to provide support for each of the sensor tracks 27 and the lead track 28. Preferably, the carrier sheet 52 is a flat flexible paper product having a low-tack adhesive applied to the surface attached to the loading face 25. Alternatively, the carrier sheet 52 may be a plastic material shrink-wrapped to the loading face 25. The carrier sheet 52 could also be any well-known flexible material capable of being attached to the loading face 25 by a static-charge. The carrier sheet 52 includes a plurality of carrier locating holes 53. One of the carrier locating holes 53 is adjacent to the center of the carrier sheet 52, and one of the carrier locating holes 53 is adjacent to one of each corner of the carrier sheet 52. The number and placement of the carrier locating holes 53 may vary depending on the size and the shape of the carrier sheet 52. The carrier locating holes 53 provide means for locating the flexible sensor apparatus 24 to the seating face 22. Specifically, each carrier locating hole 53 is adapted for receiving a corresponding locating boss of an installation device. The installation device in turn locates the carrier sheet 52 to the seating face 22. As can be appreciated, the carrier sheet 52 can be directly located to the seating face 22 by manually aligning each carrier locating hole 53 with a corresponding locating recess 23. Alternatively, the carrier sheet 52 and the seat cushion 21 may include corresponding sight-lines, notches, dimples or the like for manually locating the carrier sheet 52 to the seating face 22. The carrier sheet 52 is positioned on the flexible sensor apparatus 24 such that the flexible sensor apparatus 24 is placed in a predetermined position on the seating face 22 when the carrier sheet 52 is located to the seating face 22.

The carrier means further includes a backing sheet 54 detachably attached to the ribbon adhesive 41. The backing sheet 54 is generally the same size and shape as the carrier sheet 52. Preferably, the backing sheet 54 is a flat flexible paper product having a wax coating applied to the surface attached to the ribbon adhesive 41. Alternatively, the backing sheet 54 may be any well-known flexible material having a coefficient of friction such that the holding force between the flexible sensor apparatus 24 and the backing sheet 54 is less than the holding force between the flexible sensor apparatus 24 and the carrier sheet 52. In other words, the carrier sheet 52 must remain attached to the flexible sensor apparatus 24 when detaching the backing sheet 54 from the ribbon adhesive 41. This aspect of the backing sheet 54 is discussed below.

The backing sheet 54 includes a plurality of backing locating holes 55. Each backing locating hole 55 aligns with a corresponding carrier locating hole 53 and is generally the same shape and size as the corresponding carrier locating hole 53. The backing sheet 54 allows for easier handling of the flexible sensor apparatus 24 and protects the ribbon adhesive 41 from contamination prior to installation of the flexible sensor apparatus 24. As such, the backing sheet 54 may be eliminated provided the ribbon adhesive 41 is directly applied to the seat cushion 21 rather than directly applied to the flexible sensor apparatus 24.

Figure 11:
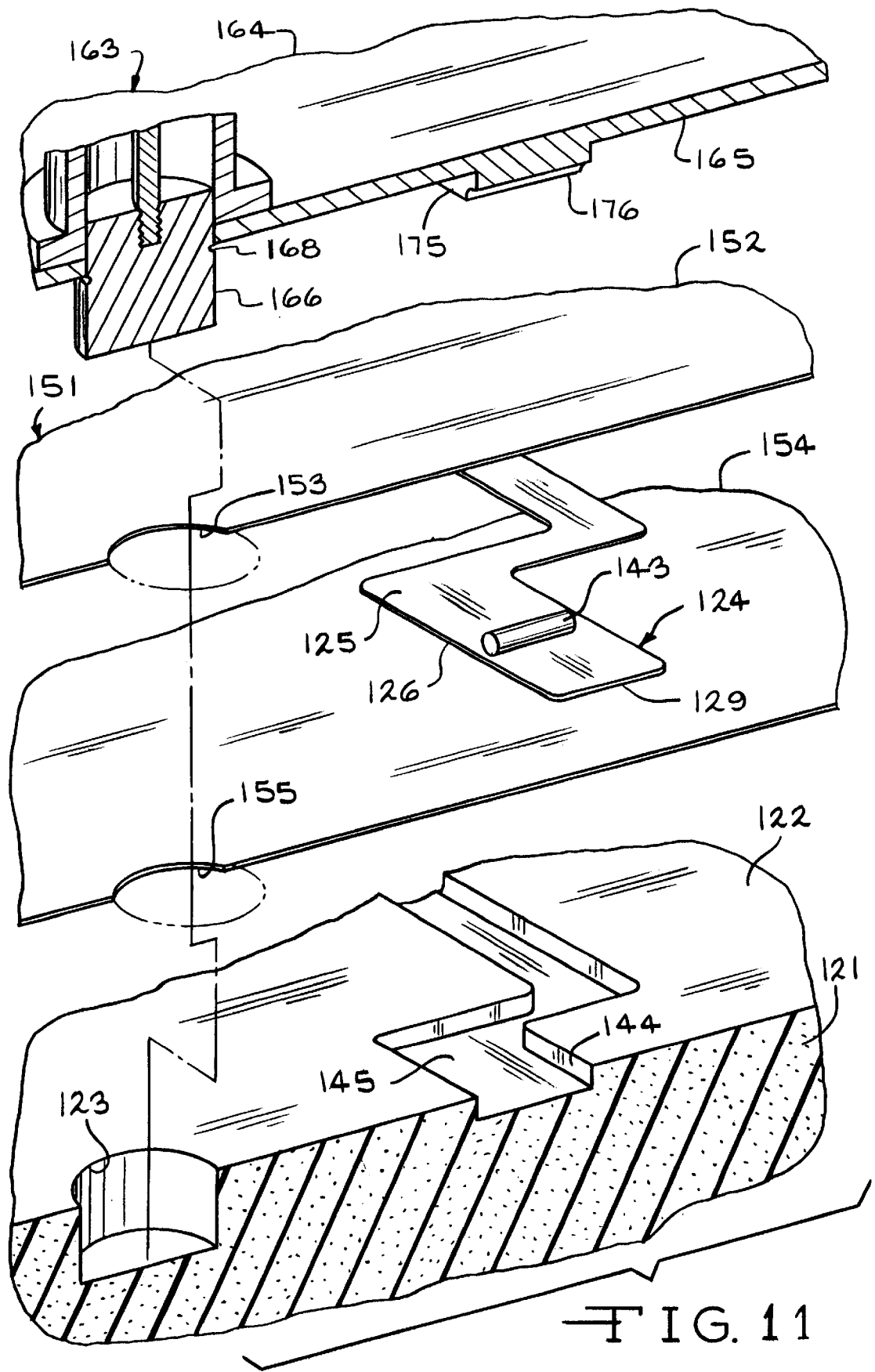
FIG. 11 is an enlarged view of a portion of the seat cushion shown in FIG. 6, as well as a perspective view of the corresponding portion of a second embodiment of an installation mat (shown exploded), and a perspective view of the corresponding portion of a second embodiment of an installation device.

A portion of a second embodiment of an installation mat is indicated generally at 151 in FIG. 11. In addition to the features described in connection with the installation mat 51, the installation mat 151 comprises a carrier means including a carrier sheet 152 detachably attached to the flexible sensor apparatus 124. The carrier sheet 152 is generally rectangular in shape and is sized so as to provide support for each of the sensor tracks 127 and the lead track 128 (FIG. 6). Each sensor track 127 and the lead track 128 are positioned on the carrier sheet 152 offset from the corresponding track channel 144 and a corresponding track projection of an installation device. The offset accommodates the carrier sheet 152 bending around track projections of during the installation of the flexible sensor apparatus 124.

The carrier sheet 152 includes a plurality of carrier apertures 156 shown in FIG. 12. Each carrier aperture 156 aligns with a corresponding tracking aperture 150. The flexible installation mat 151 further comprises a backing sheet 154 including a plurality of backing apertures 157. Each backing aperture 157 also aligns with a corresponding track aperture 150. The placement of the carrier apertures 156 and the backing apertures 157 is best shown in reference to the track apertures 150 illustrated in FIG. 6. Each pair of the corresponding carrier apertures 156 and backing apertures 157 is adapted for receiving a projection pin of an installation device corresponding to the track apertures 150 referred to above. The carrier apertures 156, track apertures 150 and backing apertures 157 are used to retain the flexible sensor apparatus 124 in a bent condition about a corresponding trim projection of an installation device.

Referring again to FIG. 11, the carrier sheet 152 further includes a plurality of carrier locating holes 153. Additionally, the backing sheet 154 includes a plurality of backing locating holes 155. Each carrier locating hole 153 aligns with a corresponding backing locating hole 155. The corresponding carrier locating holes 153 and backing locating holes 155 are adapted for receiving a corresponding locating boss of an installation device. A corresponding pair of a carrier locating hole 153 and a backing locating hole 155 is adjacent to one of each of the corners and the center of carrier sheet 152 and the backing sheet 154, respectively. Each of the carrier locating holes 153 and backing locating holes 155 adjacent to the corners of the carrier sheet 152 and backing sheet 154, respectively, are offset outwardly in each of the directions substantially parallel to and substantially perpendicular to the sensor tracks 127. The offset allows the carrier sheet 152 to bend around the track and trim projections referred to above during the installation of the flexible sensor apparatus 124. A detailed explanation for the offset is provided along with the description of the installation device below.

Figure 14:
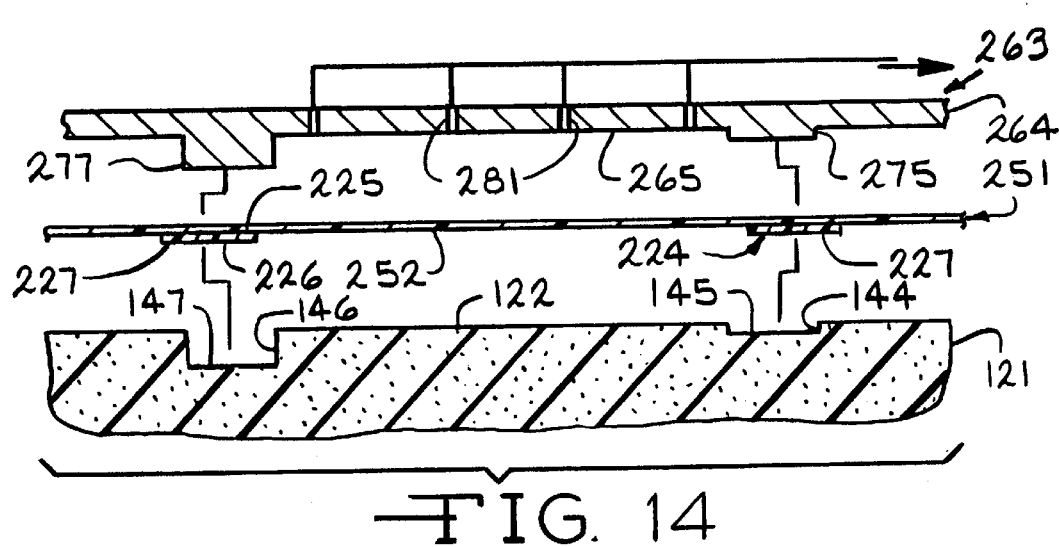
FIG. 14 is an enlarged sectional view taken along line 14—14 of FIG. 13 illustrating vacuum ports arranged in an alternative configuration, as well as a sectional view of the corresponding portion of a third embodiment of a installation mat, and a corresponding portion of the seat cushion shown in FIG. 6.

A portion of a third embodiment of an installation mat is indicated generally at 251 in FIG. 14. The installation mat 251 is similar to the installation mat 151 except that the carrier apertures 156, carrier locating holes 153, track apertures 150 and backing sheet 154 have been eliminated. The installation mat 251 comprises a carrier means including a carrier sheet 252 detachably attached to a loading face 225 opposite a mounting face 226 of a flexible sensor apparatus 224. Preferably, the carrier sheet 252 is a flat-flexible-paper product having a low-tack adhesive applied to the surface attached to the loading face 225. The flexible sensor apparatus 224 includes a plurality of sensor tracks 227 extending from a lead track (not shown) similar to the lead track 128 of the flexible sensor apparatus 124. The carrier sheet 252 is generally rectangular in shape and is sized so as to provide support for each of the sensor tracks 227 and the lead track. Each sensor track 227 and the lead track are positioned on the carrier sheet 252 offset from the corresponding track channel 146 and a corresponding track projection of an installation device. The offset is to accommodate the carrier sheet 252 bending around the track projections during the installation of the flexible sensor apparatus 224. The carrier sheet 252 further includes a locating means (not shown) for locating the flexible sensor apparatus 224 to the seating face 122. The locating means is of a well-known type such sight-lines or the like.

Figure 15:
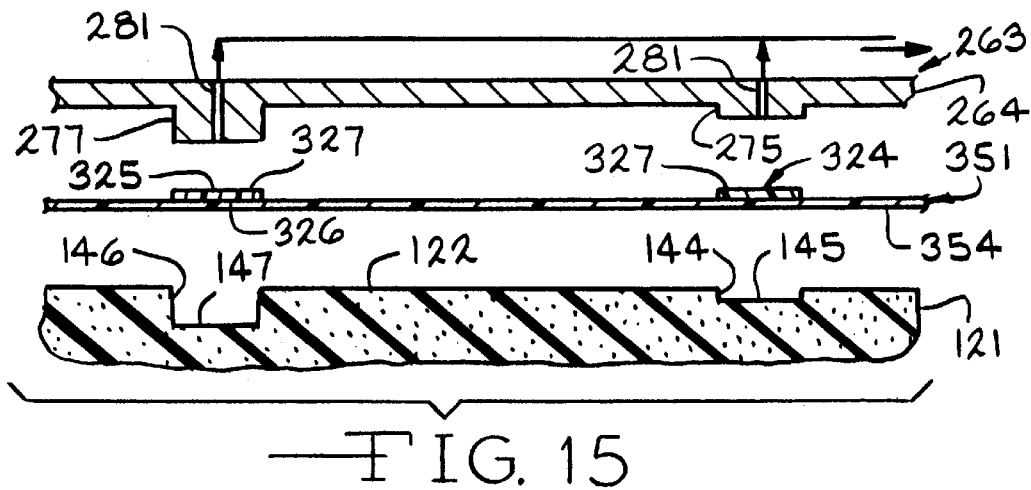
FIG. 15 is the sectional view of the lid and seat cushion as shown in FIG. 14 except for the vacuum ports are arranged in a manner similarly shown in FIG. 13, as well as a sectional view of a corresponding portion of a fourth embodiment of a installation mat.

A portion of a fourth embodiment of a installation mat is indicated generally at 351 in FIG. 15. The installation mat 351 is similar to the installation mat 151 except that the backing apertures 157, carrier locating holes 155, track apertures 150, and carrier sheet 152 have been eliminated. The installation mat 351 comprises a carrier means including a backing sheet 354 detachably attached to a mounting face 326 opposite a loading face 325 of a flexible sensor apparatus 324. Preferably, the backing sheet 354 is a flat, flexible paper product having a wax coating applied to the surface attached to the mounting face 326. The flexible sensor apparatus 324 includes a plurality of sensor tracks 327 extending from a lead track (not shown) similar to the lead track 128 of the flexible sensor apparatus 124. The backing sheet 354 is generally rectangular in shape and is sized so as to provide support for each of the sensor tracks 327 and the lead track. Each sensor track 327 and the lead track are positioned on the backing sheet 354 in alignment with a corresponding track channel 146 and a corresponding track projection of an installation device. The backing sheet 354 further includes a locating means (not shown) for locating the flexible sensor apparatus 324 to the seating face 122. The locating means can be any desired type such sight-lines or the like.

Figure 16:
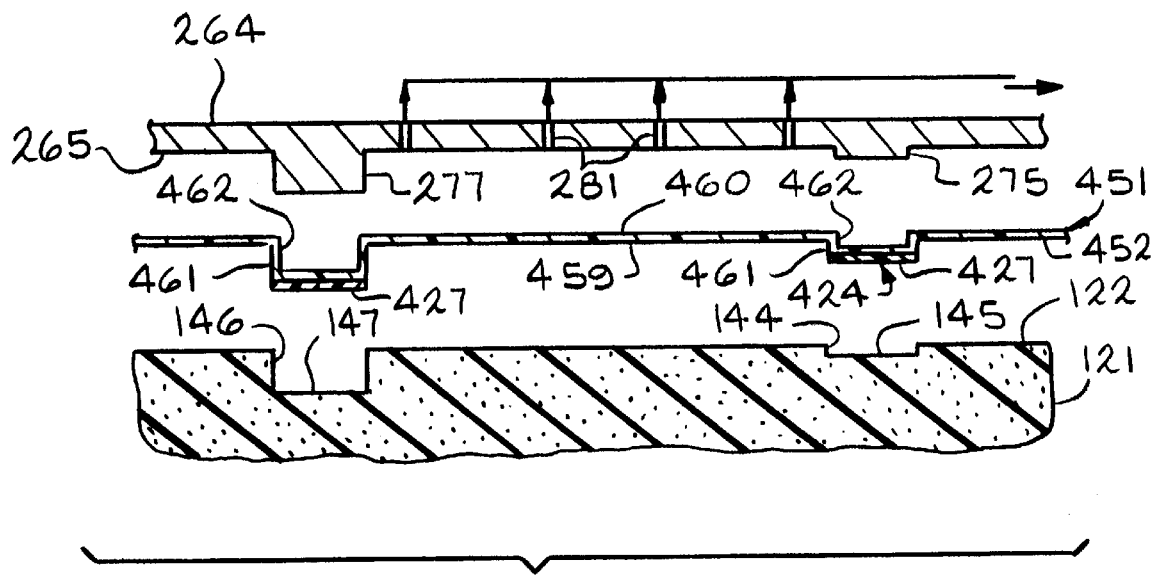
FIG. 16 is the sectional view of the lid and seat cushion as shown in FIG. 14, as well as a sectional view of a corresponding portion of a fifth embodiment of a installation mat.

A portion of a fifth embodiment of a installation mat is indicated generally at 451 in FIG. 16. The installation mat 451 comprises a carrier means consisting of a carrier sheet 452 detachably attached to a loading face 425 opposite a mounting face 426 of a flexible sensor apparatus 424. The flexible sensor apparatus 424 includes a plurality of sensor tracks 427 extending from a lead track (not shown) similar to the lead track 128 of the flexible sensor apparatus 124. The carrier sheet 452 is generally rectangular in shape and is sized so as to provide support for each of the sensor tracks 427 and the lead track. The carrier sheet 452 has a first face 459 and a second face 460 opposite the first face 459. The contour of first face 459 generally conforms to the contour of a predetermined portion of the seating face 122. The contour of the second face 460 generally conforms to the contour of a cushion face of an installation device. The carrier sheet 452 is preferably formed from a well-known semi-rigid material such as plastic, sheet metal, or the like. The carrier sheet 452 may be vacuum formed, injection molded, stamped, or the like.

The first face 459 includes a plurality of track ribs 461. Each track rib 461 is adapted for placement in a corresponding track channel 144. Each of the sensor tracks 427 and the lead track are detachably attached to a corresponding track rib 461. Preferably, a low-tack adhesive (not shown) is applied to each of the track ribs 461. The low-tack adhesive provides a means for attaching the flexible sensor apparatus 424 to the carrier sheet 452, whereby the holding force between the carrier sheet 452 and the flexible sensor apparatus 424 is less than the holding force between the flexible sensor apparatus 424 and an installation device. Alternatively, the flexible sensor apparatus 424 may be detachably attached to the carrier sheet 452 by static-charge or a magnetic force.

The second face 460 includes a plurality of track trenches 462 for locating the flexible sensor apparatus 424 to the seating face 122. Specifically, each track trench 462 is adapted for placement about a corresponding track projection of an installation device. Having placed the track trenches 462 about the track projections, the installation device locates the carrier sheet 452 to the seating face 122. The installation device and its operation are explained in detail below. As can be appreciated, the track trenches 462 may be eliminated provided that the carrier sheet 452 includes a suitable alternative locating means such as sight-lines, notches, or the like.

Figure 17:
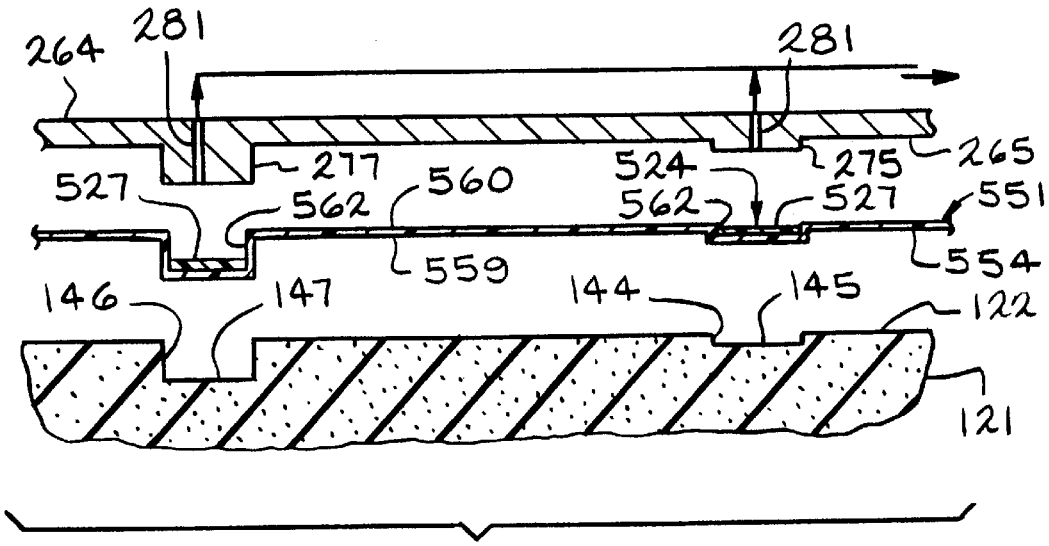
FIG. 17 is the sectional view of the lid and seat cushion as shown in FIG. 15, as well as a sectional view of a corresponding portion of a fifth embodiment of a installation mat.

A portion of a sixth embodiment of a installation mat is indicated generally at 551 in FIG. 17. The installation mat 551 comprises a carrier means consisting of a backing sheet 554 detachably attached to a mounting face 526 of the flexible sensor apparatus 524. The flexible sensor apparatus 524 includes a plurality of sensor tracks 527 extending from a lead track (not shown) similar to the lead track 128 of the flexible sensor apparatus 124. The backing sheet 554 is generally rectangular in shape and is sized so as to provide support for each of the sensor tracks 527 and the lead track. The backing sheet 554 has a second face 560. The contour of the second face 560 generally conforms to the contour of a cushion face of an installation device. The backing sheet 554 is preferably formed from a well-known semi-rigid material such as plastic, sheet metal, or the like. The backing sheet 554 may be vacuum formed, injection molded, stamped, or the like.

The second face 560 includes a plurality of track trenches 562. The sensor tracks 527 and the lead track 528 are detachably attached to a corresponding track trench 562. For applications in which a ribbon adhesive (not shown) is applied directly to the flexible sensor apparatus 524, a wax coating (not shown) is preferably applied to the attachment surface of the track trenches 562. Alternatively, the backing sheet 554 may be any well-known flexible material having a coefficient of fiction such that the holding force of the backing sheet 554 is less than the holding force between the flexible sensor apparatus 524 and an installation device. For applications in which a ribbon adhesive (not shown) is applied directly to the seating face 122, a low-tack adhesive (not shown) may applied to each track trench 562. The low-tack adhesive provides a means for attaching the flexible sensor apparatus 524 to the backing sheet 554, whereby the holding force between the backing sheet 554 and the flexible sensor apparatus 524 is less than the holding force between the flexible sensor apparatus 524 and an installation device. Alternatively, the flexible sensor apparatus 524 may be attached to the backing sheet 554 by static-charge or a magnetic force.

In addition to locating the flexible sensor apparatus 524 to the backing sheet 554, the track trenches 562 locate the flexible sensor apparatus 524 to the seating face 122. Specifically, the track trenches 562 are adapted for placement about a corresponding track projection of an installation device. Having placed the track trenches 562 about the track projections, the installation device locates the backing sheet 554 to the seating face 122.

A first embodiment of an installation device according to this invention is indicated generally at 63 in FIG. 9. The installation device 63 is used for installing the flexible sensor apparatus 24 or a similar-type apparatus such as the apparatus of the '876 patent. The installation device 63 comprises a carrier means or a lid 64 having a cushion face 65. The cushion face 65 is generally the same size and shape of the seating face 22. The contour of the cushion face 65 generally conforms to the contour of a predetermined portion of the seating face 22.

The installation device 63 further comprises locating means for locating the installation mat 51 to the seating face 22. The locating means includes a plurality of locating bosses 66 extending from the cushion face 65. Five locating bosses 66 are shown. One of the locating bosses 66 is adjacent to the center of the cushion face 65. One of each of the remaining four locating bosses 66 is adjacent to one of each of the corners of the cushion face 65. The number and placement of the locating bosses 66 may vary depending on the layout of the flexible sensor apparatus 24 for a given application. Each locating boss 66 is adapted for insertion into a corresponding locating recess 23. The installation device 63 further comprises an alternative locating means including a locating leg 67 extending from and adjacent to each corner of the lid 64. Each locating leg 67 is adapted for placement about a predetermined portion of a corresponding corner of the seat cushion 21. Alternatively, the locating means may included sight-lines or notches formed in the cushion face 21 adapted to align with a corresponding marking on the installation mat 51 and/or flexible sensor apparatus 24.

The installation device 63 further comprises mounting means for detachably mounting the installation mat 51 to the lid 64. The locating bosses 66, in addition to providing the locating means, provide the mounting means. Specifically, each of the locating bosses 66 is adapted for receiving one of each of the carrier locating holes 53 and backing locating holes 55. Referring to FIG. 10, each locating boss 66 includes a first groove 68 adjacent to the cushion face 65. The installation mat 51 is mounted to the lid 64 by placing each carrier locating hole 53 and corresponding backing locating hole 55 about a corresponding first groove 68. The first groove 68 retains the carrier locating hole 53 when removing the backing sheet 54 from the flexible sensor apparatus 24 prior to attaching the flexible sensor apparatus 24 to the seating face 22. Preferably, each of the locating bosses 66, carrier locating holes 53 and backing locating holes 55 are circular. The circumference of each of the carrier locating holes 53 and the backing locating holes 55 is generally equal to the circumference of the first groove 68. This arrangement provides that the carrier sheet 52 will remain mounted to the lid 64 when attempting to detach the backing sheet 54 from the flexible sensor apparatus 24.

Each locating boss 66 is slidably supported in a first cylinder 69 fixed to the lid 64 for movement between an extended position and a retracted position. The locating boss 66 illustrated in FIG. 10 is shown in the extended position. Each locating boss 66 is moved to the retracted position after the flexible sensor apparatus 24 is placed in contact with the seating face 22. This feature ensures that the carrier sheet 52 will be released from the lid 64 prior to withdrawing the lid 64 from the seat cushion 21. Alternatively, the locating bosses 66 may be fixed provided that the holding force between the ribbon adhesive 41 and the seating face 22 is greater than the force required to remove the carrier locating holes 53 from the first groove 68. The operations of contacting the flexible sensor apparatus 24 to the seating face 22 and removing the lid 64 from the carrier sheet 52 are discussed in greater detail below.

The installation device 63 further includes a support platform 70 for supporting the seat cushion 21 as shown in FIG. 9. The support platform 70 includes a plurality of locating posts 71 extending from a platform face 72. The support platform 70 is generally the same size and shape as a support face 73 of the seat cushion 21 opposite the seating face 22. The contour of the platform face 72 generally conforms to the contour of the support face 73. Each locating post 71 is adapted for placement in a corresponding sleeve 74 in the support face 73.

A portion of a second embodiment of an installation device is indicated generally at 163 in FIG. 11. In addition to the features indicated in FIGS. 9 and 10, the installation device 163 comprises a carrier means or a lid 164 including a cushion face 165 having a plurality of track projections 175. Each track projection 175 is adapted for insertion into a corresponding track channel 144. The shape of each track projection 175 mirrors the shape of the corresponding track channel 144. The width and height of each track projection 175 are generally equal to the width and depth, respectively, of the corresponding track channel 144. A plurality of slots 176, only one of which is illustrated, are formed in each track projection 175. Each slot 176 is adapted for receiving a corresponding flexor 143.

The cushion face 165 further includes a plurality of trim projections 177, one of which is shown in FIG. 12. Each trim projection 177 is centered opposite a corresponding center of each of the intersections between the cross-car trim channel 146 and the track channels 144 when the lid 164 is properly located to the seating face 122. Each trim projection 177 is adapted for insertion into the cross-car trim channel 146. The size of each trim projection 177 is generally equal to the depth and width of the cross-car trim channel 146 and to the width of the corresponding track channel 144.

The installation device 163 further includes a plurality projection pins 178 extending from the cushion face 165. Each projection pin 178 is adjacent to one of each corner of each intersection between the cross-car trim channel 146 and the track channels 144. As mentioned above, each of the corresponding carrier apertures 156, track apertures 150 and backing apertures 157 are placed about a corresponding projection pins 178 when mounting the installation mat 151 to the lid 164. In doing so, the flexible sensor apparatus 124 is held in a bent position about the trim projection 177, whereby the corresponding portion of the flexible sensor apparatus 124 generally conforms to the shape of the corresponding trim projection 177. This arrangement ensures that the flexible sensor apparatus 124 will be properly inserted into the cross-car trim channel 146 when placing the flexible sensor apparatus 124 in contact with the seating face 122. Preferably, each of the projection pins 178, carrier apertures 156, track apertures 150 and backing apertures 157 is circular. In addition, each projection pin 178 includes a second groove 179 adjacent to the cushion face 165 for receiving the corresponding carrier apertures 156, track apertures 150 and backing apertures 157. The circumferences of the corresponding second grooves 179, carrier apertures 156, track apertures 150 and backing apertures 157 are generally equal in size. This arrangement ensures that the carrier sheet 152 is retained to lid 164 when attempting to detach the backing sheet 154 from the flexible sensor apparatus 124. The track apertures may be eliminated provided that the holding force between the carrier sheet 152 and the flexible sensor apparatus 124 is sufficient to retain the flexible sensor apparatus 124 about each trim projection 177 after the backing sheet 154 is removed.

Each projection pin 178 is slidably supported in a second cylinder 180 formed in the lid 164 for movement between an extended position and a retracted position. The projection pins 178 illustrated in FIG. 12 are shown in the extended position. Each projection pin 178 is moved to the retracted position after the flexible sensor apparatus 124 is placed in contact with the seating face 122. This feature ensures that the carrier sheet 152 will be released from the lid 164 prior to withdrawing the lid 164 from the seat cushion 121. Alternatively, the projection pins 178 may be fixed provided that the holding force between the flexible sensor apparatus 124 and the seating face 122 is greater than the force required to remove the carrier apertures 156 from the second groove 179.

Figure 13:
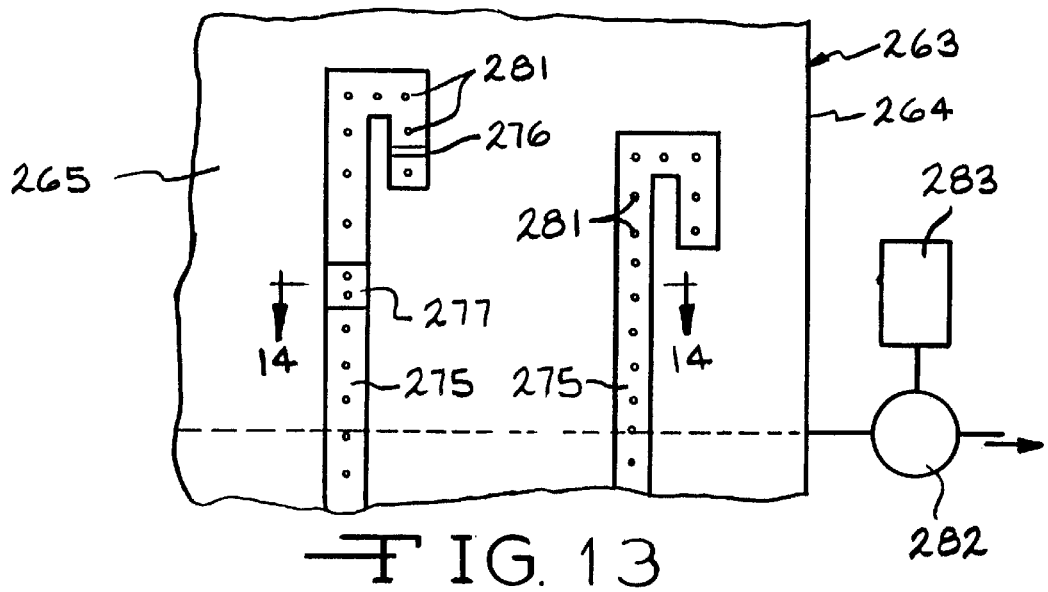
FIG. 13 is a plan view of a portion of a third embodiment of an installation device according to this invention illustrating a cushion face of a lid.

A portion of a third embodiment of an installation device is indicated generally at 263 in FIGS. 13 and 14. The installation device 263 includes each of the features of the installation device 163 except that the locating bosses 166 and the projection pins 178 have been eliminated. In addition, the installation device 263 comprises a carrier means or a lid 264 having a cushion face 265. The cushion face 265 includes a plurality of track projections 275. Each track projection 275 is adapted for insertion into a corresponding track channel 144. The shape of each track projection 275 mirrors the shape of the corresponding track channel 144. The width and height of each track projection 275 are generally equal to the width and depth, respectively, of the corresponding track channel 144. A slot 276 is formed in the track projections 275 opposite the placement of each flexor 143 having the lid 264 properly located to the seating face 122.

The cushion face 265 further includes a plurality of trim projections 277. Each trim projection 277 is centered opposite a corresponding center of each intersection between the cross-car trim channel 146 and the track channels 144 when the lid 264 is properly located to the seating face 122. Each trim projection 277 is adapted for insertion into the cross-car trim channel 146. The size of each trim projection 277 is generally equal to the depth and width of the cross-car trim channel 146 and to the width of the corresponding track channel 144.

The cushion face 265 further includes mounting means including a plurality of vacuum ports 281. Each vacuum port 281 is connected to a vacuum pump 282. A motor 283 drives the vacuum pump 282. Preferably, the vacuum ports 281 are located along each track projection 275 and each trim projection 277, as shown in FIG. 13. Alternatively, the vacuum ports 281 may be adjacent to each track projection 275 and each trim projection 277, as shown in FIG. 14, depending on a given application. Having properly located a given carrier means and/or the flexible sensor apparatus 124 to the cushion face 265, a vacuum is applied between each vacuum port 281 and the given carrier means and/or the flexible sensor apparatus 124, thereby retaining the given carrier means and/or the flexible sensor apparatus 124.

The track projections 275 and trim projections 277 may be eliminated when using a modified version of the installation mat 451. Specifically, the cushion face 265 and the second face 460 each may be preformed to mate with one another. An advantage of this arrangement is that the lid 464 becomes generic for any given application.

The following is a detailed description of preferred methods for installing the flexible sensor apparatus 24, 124, 224, 324, 424, 524 to the seating face 22, 122 of the seat cushion 21, 121 of the vehicular seat cushion assembly 20, 120.

Each of the preferred methods according to this invention comprises the steps of first, providing carrier means 30, 52, 54, 64, 164, 152, 154, 252, 254, 264 354, 452, 554 having the flexible sensor apparatus 24, 124 attached to a predetermined portion of the carrier means 30, 52, 54, 64, 164, 152, 154, 252, 254, 264 354, 452, 554; second, aligning the carrier means 30, 52, 54, 64, 164, 152, 154, 252, 254, 264 354, 452, 554 with the seating face 22, 122 wherein the flexible sensor apparatus 24, 124 is adjacent to the seating face 22, 122; and third, attaching the flexible sensor apparatus 24, 124 to the seating face 22, 122.

The preferred methods may include additional steps and/or sub-steps to the above identified steps depending on which carrier means 30, 52, 54, 64, 164, 152, 154, 252, 254, 264 354, 452, 554 is utilized for installing a given flexible sensor apparatus 24, 124, 224, 324, 424, 524 to a given seating face 22, 122.

A first preferred method uses the carrier means 30 including the trim cover 30 and a lid (not shown) of an installation device (not shown) for installing a trim cover to a seat cushion. The installation device is of a well-known type such as installation device described in U.S. Pat. Nos. 4,885,828 and 4,692,199, and herein incorporated by reference. The flexible sensor apparatus 24 is fixedly attached to a predetermined portion of the underside of the trim cover 30 in a manner previously set forth. The trim cover 30 is then detachably attached to a predetermined portion of a cushion face (not shown) of the lid. In attaching the trim cover 30 to the cushion face, the trim cover 30 and the flexible sensor apparatus 24 are bent so as to generally conform to the contour of the cushion face which is complementary of the contour of the seating face 22. In turn, the cushion face is aligned with the seating face 22.

Prior to attaching the flexible sensor apparatus 24 to the seating face 22, the support face 73 of the seat cushion 21 is mounted to a support platform (not shown) of the installation device. The flexible sensor apparatus 24 is attached to the seating face 22 by moving the lid and/or the support platform toward the other. The lid and support platform continue to move relatively toward each other until the trim adhesive 31 and the ribbon adhesive 41 contact the seating face 22, thereby adhering the flexible sensor apparatus 24 to the seating face 22. The trim adhesive 31 is then brought into a fluid state whereby the trim cover 30 is bonded to the seat cushion 21. The trim cover 30 is then detached from the lid. Finally, the lid and the support platform are separated from each other.

A second preferred method uses the carrier means 130 including the trim cover 130 and the lid associated with the first preferred method for installing the flexible sensor apparatus 124 to the seating face 122. In addition to each of the steps of the first preferred method, the second preferred method includes bending each sensor track 127 corresponding to the cross-car trim channels 146 so as to form a loop which generally conforms to the shape of the corresponding cross-car trim channel 146. The flexible sensor apparatus 124 is then attached to trim cover 130 in a manner whereby the loop is retained. The flexible sensor apparatus 124 is attached by moving the lid and/or the support platform toward the other so as to crush the seat cushion 121. The crushing of the seat cushion 121 continues until the first and second base surfaces 145 and 147 of the seating face 122 are generally flush with the adjacent outermost portion of the seating face 122. In turn, the ribbon adhesive 41 applied to the sensor tracks 127 and lead track 128 contacts the corresponding first and second base surfaces 145 and 147, thereby adhering the flexible sensor apparatus 124 to the seating face 122.

A third preferred method uses the carrier means 52, 54, 64 including the carrier sheet 52, backing sheet 54 and lid 64 for installing the flexible sensor apparatus 24 to the seating face 22. The flexible sensor apparatus 24 is detachably attached to a predetermined portion of each of the carrier sheet 52 and backing sheet 54 in a manner previously described, thereby forming the installation mat 51. The installation mat 51 is then detachably attached to the lid 64 by placing each carrier locating hole 53 and corresponding backing locating hole 55 about the first groove 68 of the corresponding locating boss 66. In attaching the installation mat 51 to the cushion face, the installation mat 51 is bent so as to generally conform to the contour of the cushion face 65 which is complementary of the contour of the seating face 22. The backing sheet is then removed, thereby exposing the ribbon adhesive 41.

Prior to attaching the flexible sensor apparatus 24 to the seating face 22, the seat cushion 21 is mounted to the support platform 70 by placing each locating post 71 in the corresponding sleeve 74. The lid 64 is then located to the seat cushion by moving the lid 64 and/or the support platform 70 toward the other so as to place the locating bosses 66 in the corresponding locating recesses 23 of the seat cushion 21. Alternatively, the lid 64 may be located to the seat cushion 21 by placing the locating legs 67 about a predetermined portion of the perimeter of the seat cushion 21. The flexible sensor apparatus 24 is attached to the seating face 22 by continuing the relative advancement of the lid 64 toward the support platform 70 until the ribbon adhesive 41 contacts the seating face 22, thereby adhering the flexible sensor apparatus 24 to the seating face 22. The locating bosses 66 are then retracted, thereby releasing the carrier sheet 52 from the lid 64. In turn, the lid 64 is removed from the seat cushion 21. Finally, the carrier sheet 52 is detached from the flexible sensor apparatus 24.

A fourth preferred method uses the carrier means 52, 54, 64 including the carrier sheet 52, backing sheet 54 and lid 64 for installing the flexible sensor apparatus 24 to the seating face 122 less the cross-car trim channels 146. The fourth preferred method includes each of the steps of the third preferred method. In addition, the flexible sensor apparatus 24 is attached by moving the lid 164 and support platform 70 toward each other so as to crush the seat cushion 121. The crushing of the seat cushion 121 continues until the first base surface 145 of the seating face 122 is generally flush with the adjacent outermost portion of the seating face 122. In turn, the ribbon adhesive 41 applied to the sensor tracks 127 and lead track 128 contacts the corresponding first base surfaces 145, thereby adhering the flexible sensor apparatus 124 to the seating face 122.

A fifth preferred method uses the carrier means 152, 154, 164 including the carrier sheet 152, backing sheet 154 and lid 164 for installing the flexible sensor apparatus 124 to the seating face 122. In addition to each of the steps of the third preferred method, the fifth preferred method includes placing each corresponding carrier, sensor and backing aperture 156, 150, 157 about the second groove 179 of the corresponding projection pin 178. In doing so, the corresponding sensor track 127 is bent and held around the corresponding trim projection 177 extending from the cushion face 165. Also, by placing the carrier and backing locating holes 153, 155 about the first groove 168 of the corresponding locating boss 166, the sensor tracks 127 and lead track 128 are aligned with the corresponding track projections 175 extending from the cushion face 165. The flexible sensor apparatus 124 is then attached by advancing the lid 164 relative to the support platform 70 so as to place track and trim projections 175, 177 in the corresponding track and trim channels 144, 146. The advancement of the lid 164 relative to the support platform 70 continues until the ribbon adhesive 41 applied to the sensor tracks 127 and lead track 128 contacts the corresponding portion of the seating face 122, thereby adhering the flexible sensor apparatus 124 to the seating face 122.

A sixth preferred method uses the carrier means 252, 264 including the carrier sheet 252 and the lid 264 for installing the flexible sensor apparatus 224 to the seating face 122. The sixth preferred method includes each of the steps of the fifth preferred method except for the installation mat 251 is aligned with the lid 264 by a suitable manner such as previously set forth in place of using the locating bosses and holes 166, 153, 155. Also, the installation mat 251 is attached to the lid 264 by applying a vacuum between the carrier sheet 252 and the cushion face 265 of the lid 264 rather than by use of the locating bosses and holes 166, 153, 155. Additionally, the sensor tracks 127 are bent and held about the corresponding trim projections 277 by using the vacuum in place of the projection pins 178 and apertures 150, 156, 157. Furthermore, the steps of detachably attaching and detaching the backing sheet 154 to and from the flexible sensor apparatus 124 have been eliminated, in that the need for the backing sheet 154 has been eliminated by having the ribbon adhesive 41 be directly applied to seating face 122. Accordingly, the flexible sensor apparatus 224 is adhered to the seating face 122 by contacting the sensor tracks 227 and the lead track 228 to the ribbon adhesive 41, as opposed to contacting the ribbon adhesive 41 to the seating face 122.

A seventh preferred method uses the carrier means 452, 264 including the preformed carrier sheet 452 and the lid 264 for installing the flexible sensor apparatus 424 to the seating face 122. The seventh preferred method includes each of the steps of the sixth preferred method, except that the flexible sensor apparatus 424 is aligned with the carrier sheet 452 by aligning the sensor tracks 427 and the lead track 428 with the corresponding track ribs 461. In addition, the installation mat 451 is aligned with the lid 264 by placing the track trenches 462 about the corresponding track and trim projections 275 and 274.

An eighth preferred method uses the carrier means 354, 264 including the backing sheet 354 and the lid 264 for installing the flexible sensor apparatus 324 to the seating face. The eighth preferred method includes each of the steps of the sixth preferred method except that the vacuum is applied directly between the flexible sensor apparatus 324 and the cushion face 265, due to the backing sheet 354 being substituted in place of the carrier sheet 252. Additionally, as opposed to detaching the carrier sheet 252 after the flexible sensor apparatus 224 is attached to the seating face 122, the backing sheet 354 is detached from the flexible sensor apparatus 324 prior to attaching the flexible sensor apparatus 324 to the seating face 122. Furthermore, the flexible sensor apparatus 324 is adhered to the seating face 122 by contacting ribbon adhesive 41 to the seating face 122, as opposed to contacting the flexible sensor apparatus 224 to the ribbon adhesive 41.

A ninth preferred method uses the carrier means 554, 264 including the preformed backing sheet 554 and the lid 264. The ninth preferred method incorporates each of the steps of the eight preferred method, except for the flexible sensor apparatus 124 is aligned with the backing sheet 452 by placing the sensor tracks 127 and the lead track 128 in the corresponding track trench 562. Furthermore, the flexible sensor apparatus 124 is adhered to the seating face 122 by contacting ribbon adhesive 41 to the seating face 122 rather than the reverse.

In summary, the flexible sensor apparatus 24, 124 can be attached to the seating face 22, 122 utilizing a trim cover 30, 130 having the flexible sensor apparatus 24, 124 attached to the underside of the trim cover 30, 130. The flexible sensor apparatus 24, 124, 224, 324, 424, 524 can also be installed by utilizing the installation mat 51, 151, 251, 351, 451, 551. The installation mat 51, 151, 251, 351, 451, 551 may be located manually to the seating face 22, 122 or by use of one of a given installation device 63, 163, 263.

The locating bosses 66, 166 provide a means for locating and mounting the installation mat 51, 151 to the cushion face 65, 165 of the lid 64, 164. The projection pins 178 provide a means for retaining each of the sensor tracks 127 corresponding to a trim projection 177 in a bent condition about the corresponding trim projection 177. Alternatively, the locating bosses 66, 166 and projection pins 178 may be replaced by applying a vacuum between the cushion face 265 and the installation mat 251, 351, 451, 551.

Having mounted the installation mat 51, 151, 251, 351, 451, 551 to the cushion face 65, 165, 265, the backing sheet 54, 154, 354, 554 is removed from the flexible sensor apparatus 24, 124, 324, 524. The cushion face 65, 165, 265 is then aligned with the seat cushion 21, 121. In turn, the cushion face 65, 165, 265 is moved toward the seating face 22, 122. As the cushion face 165, 265 advances, the track projections 175 and the trim projections 177 are inserted into the corresponding track channels 144 and the cross-car trim channels 146, respectively. The cushion face 65, 165, 265 continues its movement until the ribbon adhesive 41 contacts the seating face 22, 122, thereby adhering the flexible sensor apparatus 24, 124, 224, 324, 424, 524 to the seating face 22, 122.

Alternatively, the lid 64, absent the track and trim projections 175, 177, may be used for installing the flexible sensor apparatus 24 to the seat cushion 124 less the cross-car trim channels 146. Regarding this application, the cushion face 65 is further advanced so as to crush the seat cushion 121 between the lid 64 and the support platform 70. The crushing of the seat cushion 121 continues until the ribbon adhesive 41 contacts the first base surface 145.

Having adhered the flexible sensor apparatus 24, 124, 224, 324, 424, 524 to the seating face 22, 122, the locating bosses 66, 166 and the projection pins 178 are retracted, or alternatively, the vacuum is released. The carrier sheet 52, 152, 252, 452 is the released from the lid 64, 164, 264. In turn, the lid 64, 164, 264 is removed from the seat cushion 21, 121. Finally, the carrier sheet 52, 152, 252, 452 is detached from the flexible sensor apparatus 24, 124, 324, 554.

As previously described, the flexible sensor apparatus 24, 124, 224, 324, 424, 524 is preferably attached to the seating face 22, 122 by contacting the ribbon adhesive 41 to the seating face 22, 122. Alternatively, the ribbon adhesive may be replaced by a suitable attachment means. In addition, the ribbon adhesive 41 may be applied directly to the seating face 22, 122.

For applications having the ribbon adhesive 41 applied directly to the seating face 22, 122, the backing sheets 54, 154 which do not provide a means for locating the flexible sensor apparatus 24, 124, 354 to the lid 64, 164, 264 become obsolete.

Regarding applications utilizing a vacuum for mounting the installation mat 251, 351, 451, 551 to the lid 264, the projection pins 178 are unnecessary.

In addition, for applications utilizing a vacuum, the locating bosses 66, 166 are obsolete provided that an alternative locating means is incorporated between the lid 64, 164, 264 and the carrier sheet 52, 152, 252, 452. Furthermore, by utilizing a vacuum, the carrier sheet 52, 152, 252, 452 may be eliminated provided the flexible sensor apparatus 24, 124, 224, 424 and the lid 64, 164, 264 include corresponding locating means. Accordingly, the flexible sensor apparatus 24, 124 can be mounted directly to the lid 264 of the installation device 263 without the aid of an installation mat.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of installing a flexible sensor apparatus to a seating face of a seat cushion of a vehicular seat assembly, wherein the seating face includes at least one channel having a base surface and the flexible sensor apparatus includes at least one track, the method comprising the steps of:

providing carrier means having the flexible sensor apparatus attached to a predetermined portion of the carrier means;

aligning the carrier means with the seating face so that the flexible sensor apparatus is adjacent to the seating face; and attaching the flexible sensor apparatus to the seating face, including placing the at least one track in the at least one channel whereby the flexible sensor apparatus contacts the base surface.

2. The method according to claim 1 wherein the flexible sensor apparatus includes a flexible ribbon having a loading face and an mounting face opposite the loading face and a ribbon adhesive applied to a predetermined portion of the mounting face, said step of attaching the flexible sensor apparatus to the seating face including:

contacting the ribbon adhesive to the seating face whereby the flexible sensor apparatus is adhered to the seating face.

3. The method according to claim 1 wherein a predetermined portion of the seating face includes a ribbon adhesive, said step of attaching the flexible sensor apparatus to the seating face including:

contacting the flexible sensor apparatus to the ribbon adhesive whereby the flexible sensor apparatus is adhered to the seating face.

4. The method according to claim 1 wherein the vehicular seat assembly includes a trim cover having underside and a trim adhesive applied to the underside, said step of attaching the flexible sensor apparatus to the seating face including:

adhering the trim cover to seating face whereby the flexible sensor apparatus is disposed between the trim adhesive and the seating face.

5. The method according to claim 1 wherein the carrier means includes a trim cover having an underside, said step of attaching the flexible sensor apparatus to the seating face including:

attaching the trim cover to the seating face.

6. The method according to claim 5 wherein the trim cover includes a trim adhesive, said step of attaching the trim cover to the seating face including:

adhering the trim cover to the seating face.

7. The method according to claim 5 wherein said step of providing carrier means having the flexible sensor apparatus attached to a predetermined portion of the carrier means includes:

attaching the flexible sensor apparatus to the underside of the trim cover.

8. The method according the claim 5 using an installation device including a support platform and a lid having a cushion face, wherein the carrier means further includes the lid and the seat cushion includes a support face opposite the seating face, said method further comprising the steps of:

mounting the support face to the support platform prior to attaching the flexible sensor apparatus to the seating face; and detaching the lid from the trim cover after attaching the flexible sensor; said step of providing carrier means having the flexible sensor apparatus attached to a predetermined portion of the carrier means including:

detachably attaching the trim cover to a predetermined portion of the cushion face; and said step of attaching the flexible sensor apparatus to the seating face including:

moving the lid and the support platform relative to one another.

9. A method of installing a flexible sensor apparatus to a seating face of a seat cushion of a vehicular seat assembly, the method comprising the steps of:

providing carrier means having the flexible sensor apparatus detachably attached to a predetermined portion of the carrier means;

aligning the carrier means with the seating face so that the flexible sensor apparatus is adjacent to the seating face;

attaching the flexible sensor apparatus to the seating face; and detaching the carrier means from the flexible sensor apparatus.

10. The method according to claim 9 wherein the carrier means includes a carrier sheet having a locating means for locating the flexible sensor apparatus to the seating face, said step of providing carrier means having the flexible sensor apparatus attached to a predetermined portion of the carrier means including:

detachably attaching the flexible sensor apparatus to a predetermined portion of the carrier means.

11. The method according to claim 10 wherein the carrier sheet includes a low-tack adhesive, said step of detachably attaching the flexible sensor apparatus to a predetermined of the carrier sheet including:

contacting the flexible sensor apparatus to the low-tack adhesive.

12. The method according to claim 10 wherein the flexible sensor apparatus includes a ribbon adhesive and the carrier means includes a backing sheet, said step of providing carrier means having the flexible sensor apparatus attached to a predetermined portion of the carrier means including:

detachably attaching the flexible sensor apparatus to a predetermined backing sheet whereby the backing sheet covers the ribbon adhesive; and said step of detaching the carrier means from the flexible sensor apparatus including:

detaching the backing sheet prior to attaching the flexible sensor apparatus to the seating face; and detaching the carrier sheet from the flexible sensor apparatus after attaching the flexible sensor apparatus to the seating face.

13. The method according to claim 9 using an installation device including a support platform and a lid having a cushion face, wherein the carrier means includes the lid and the seat cushion includes a support face opposite the seating face, said method further comprising the step of:

mounting the support face to the support platform prior to attaching the flexible sensor apparatus to the seating face; said step of providing carrier means having the flexible sensor apparatus attached to a predetermined portion of the carrier means including:

detachably attaching the flexible sensor apparatus to a predetermined portion of the cushion face; said step of attaching the flexible sensor apparatus to the seating face including:

moving the lid and the support platform relative to one and other; and said step of detaching the carrier means from the flexible sensor apparatus including:

detaching the lid from the flexible sensor apparatus after attaching the flexible sensor apparatus to the seating face.

14. The method according to claim 13 wherein the lid includes at least one locating leg, said step of aligning the carrier means with the seating face including:

placing the at least one locating leg about a predetermined portion of the perimeter of the seat cushion.

15. The method according to claim 13 wherein the cushion face includes a plurality vacuum ports, said step of detachably attaching the flexible sensor apparatus to a predetermined portion of the cushion face including:

applying a vacuum between the cushion face and the flexible sensor apparatus.

16. The method according to claim 13 wherein the seating face includes at least one channel having a base surface and the flexible sensor apparatus includes at least one track, said step of moving the lid and the support platform relative to one and other including:

deforming the seating face adjacent to the at least one channel, whereby the flexible sensor apparatus contacts the base surface.

17. The method according to claim 13 wherein the cushion face includes at least one projection, the flexible sensor apparatus includes at least one track and the seating face includes at least one channel having a base surface, said step of detachably attaching the flexible sensor apparatus to a predetermined portion of the cushion face including:

aligning the at least one track with the at least one projection; and said step of moving the lid and support platform relative to one and other including:

placing the at least one projection in the at least one channel, whereby the flexible sensor apparatus contacts the base surface.

18. The method according to 13 wherein said carrier means further includes a backing sheet having a locating means for locating the flexible sensor apparatus to the seating face, said step of detachably attaching the flexible sensor apparatus to a predetermined portion of the cushion face including:

detachably attaching the backing sheet to a predetermined portion of the cushion face; and said step of detaching the carrier means from the flexible sensor apparatus including:

detaching the backing sheet from the lid prior to attaching the flexible sensor apparatus to the seating face; and detaching the lid from the flexible sensor apparatus after attaching the flexible sensor apparatus to the seating face.

19. The method according to claim 18 wherein said step of detachably attaching the flexible sensor apparatus to a predetermined portion of the cushion face includes:

detachably attaching the flexible sensor apparatus to a predetermined portion of the backing sheet.

20. The method according to claim 18 wherein the cushion face includes a plurality of vacuum ports, said step of detachably attaching the backing sheet to a predetermined portion of the cushion face including:

applying a vacuum between the cushion face and the backing sheet.

21. The method according to claim 18 wherein the flexible sensor apparatus includes at least one track, the seating face includes at least one channel having a base surface, and the lid includes at least one projection extending from the cushion face, said step of detachably attaching the backing sheet to a predetermined portion of the cushion face including:

detachably attaching the at least one track to the at least one projection; and said step of moving the lid and the support platform relative to one and other including:

placing the at least one projection in the at least one channel whereby the flexible sensor apparatus contacts the base surface.

22. The method according to claim 11 wherein the backing sheet includes at least one track trench, said step of detachably attaching the backing sheet to a predetermined portion of the cushion face including:

placing the at least one track in said at least one track trench; and placing the at least one projection in the at least on track trench after placing the at least one track in said at least one track trench.

23. The method according to claim 13 wherein the carrier means further includes a carrier sheet having a locating means for locating the flexible sensor apparatus to the seating face, said step of detachably attaching the flexible sensor apparatus to a predetermined portion of the cushion face including:

detachably attaching the carrier sheet to a predetermined portion of the cushion face; and said step of detaching the carrier means from the flexible sensor apparatus including:

detaching the lid from the carrier sheet after attaching the flexible sensor apparatus to the seating face; and detaching the carrier sheet from the flexible sensor apparatus after attaching the flexible sensor apparatus to the seating face.

24. The method according to claim 23 wherein said step of detachably attaching the flexible sensor apparatus to a predetermined portion of the cushion face includes:

detachably attaching the flexible sensor apparatus to a predetermined portion of the carrier sheet.

25. The method according to claim 23 wherein the lid includes at least one projection and a plurality of projection pins extending from the cushion face adjacent to the at least one projection, the carrier sheet includes a plurality of apertures, the flexible sensor apparatus includes a plurality of track apertures, each projection pins corresponding to one of each of the plurality of carrier and track apertures, the carrier sheet being flexible, and the flexible sensor apparatus being flexible, said step of detachably attaching the carrier sheet to a predetermined portion of the cushion face including:

bending the carrier sheet;

bending the flexible sensor apparatus; and placing the each of the apertures about the corresponding projection pin.

26. The method according to claim 25 wherein each of the projection pins is retractable, said step of detaching the lid from the carrier sheet including:

retracting each of the projection pins whereby each of the projection pins is removed from the corresponding carrier and track apertures.

27. The method according to claim 18 wherein the cushion face includes a plurality of vacuum ports, said step of detachably attaching the backing sheet to a predetermined portion of the cushion face including:

applying a vacuum between the cushion face and the backing sheet.

28. The method according to claim 27 wherein the carrier sheet includes a first face having at least one track rib, the flexible sensor includes at least one track, and the seating face includes at least one track channel, said step of detachably attaching the flexible sensor apparatus to a predetermined portion of the carrier sheet including:

detachably attaching the at least one track to the at least one track rib; and said step of moving the lid and the support platform relative to one and other including:

placing the at least one track rib in the at least one track channel track channel whereby the flexible ribbon apparatus contacts the seating face.

29. The method according to claim 23 wherein the carrier sheet includes at least one carrier locating hole and the lid includes at least one locating boss extending from the cushion face, said step of detachably attaching the carrier sheet to a predetermined portion of the cushion face including:

placing the at least one carrier locating hole about the at least one locating boss.

30. The method according to claim 29 wherein the seating face includes at least one locating recess, said step of aligning the carrier means with the seating face including:

placing the at least one locating boss in the at least one carrier locating hole.

31. The method according to claim 30 wherein the at least one locating boss is retractable, said step of detaching the lid from the carrier sheet including:

retracting the at least one locating boss whereby the at least one locating boss is removed from the at least one carrier locating hole.

32. A method of installing a flexible sensor apparatus to a seating face of a seat cushion of a vehicular seat assembly, the method comprising the steps of:

providing carrier means having the flexible sensor apparatus attached to a predetermined portion of the carrier means;

aligning the carrier means with the seating face so that the flexible sensor apparatus is adjacent to the seating face;

bending a predetermined portion of the flexible sensor apparatus, whereby the bent portion of the flexible sensor apparatus generally conforms to the contour of a corresponding portion of the seating face; and attaching the flexible sensor apparatus to the seating face.

33. The method according to claim 32 wherein the carrier means is flexible, said method further comprising the step of:

bending a predetermined portion of the carrier means whereby the bent portion of the carrier means generally conforms to the contour of a corresponding portion of the seating face.

* * * * *